(12) United States Patent
Caulfield et al.

(10) Patent No.: US 11,212,023 B2
(45) Date of Patent: Dec. 28, 2021

(54) SYSTEMS AND METHODS FOR NODES COMMUNICATING USING A TIME-SYNCHRONIZED TRANSPORT LAYER

(71) Applicant: Microsoft Technology Licensing, LLC, Redmond, WA (US)

(72) Inventors: Adrian M. Caulfield, Woodinville, WA (US); Michael K. Papamichael, Redmond, WA (US); Ang Li, Jersey City, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 16/675,864

(22) Filed: Nov. 6, 2019

(65) Prior Publication Data

US 2021/0135773 A1    May 6, 2021

(51) Int. Cl.
*H04J 3/06* (2006.01)
*G06F 1/12* (2006.01)
*H04L 12/26* (2006.01)
*H04L 29/06* (2006.01)

(52) U.S. Cl.
CPC .............. *H04J 3/0664* (2013.01); *G06F 1/12* (2013.01); *H04L 43/0858* (2013.01); *H04L 69/28* (2013.01)

(58) Field of Classification Search
None
See application file for complete search history.

(56) References Cited

U.S. PATENT DOCUMENTS

| 10,348,481 | B1 | 7/2019 | Wetterwald et al. |
| 2011/0185394 | A1 | 7/2011 | Rakib |
| 2019/0356466 | A1* | 11/2019 | Kratz ................. H04W 56/002 |
| 2020/0196299 | A1* | 6/2020 | Liu ........................ H04L 69/24 |

(Continued)

FOREIGN PATENT DOCUMENTS

EP        2811796 A1    12/2014

OTHER PUBLICATIONS

Caulfield, et al., "A Cloud-Scale Acceleration Architecture", In Proceedings of the 49th Annual IEEE/ACM International Symposium on Microarchitecture, Oct. 15, 2016, 13 Pages.

(Continued)

*Primary Examiner* — Anh Vu H Ly
(74) *Attorney, Agent, or Firm* — Ranjeev Singh; Singh Law, PLLC

(57) ABSTRACT

Systems and methods that provide for transmission of messages among nodes (e.g., acceleration components configurable to accelerate a service) using a time-synchronized transport layer (TSL) protocol are provided. An example method, in a network comprising at least a first node, a second node, and a third node, includes each of the at least the first node, the second node, and the third node synchronizing a respective clock to a common clock. The method further includes each of the at least the first node, the second node, and the third node scheduling data transmission in the network in a manner such that at a particular time in reference to the common clock each of the at least the first node, the second node, and the third node is scheduled to receive data from only one of the first node, the second node, or the third node.

18 Claims, 17 Drawing Sheets

(56) References Cited

U.S. PATENT DOCUMENTS

2020/0343988 A1* 10/2020 Nandiraju ............. H04J 3/0667
2020/0351119 A1* 11/2020 Rentschler ........ H04L 12/40032

OTHER PUBLICATIONS

Caulfield, et al., "Beyond SmartNICs: Towards a Fully Programmable Cloud", In Proceedings of the IEEE International Conference on High Performance Switching and Routing, Jun. 2018, 6 Pages.

Fowers, et al., "A Configurable Cloud-Scale DNN Processor for Real-Time AI", In Proceedings of the 45th Annual International Symposium on Computer Architecture, Jun. 2, 2018, 14 Pages.

Putnam, et al., "Heterogeneous Computing @ Microsoft", In Microsoft Research Paper, Sep. 11, 2019, 48 Pages.

"International Search Report and Written Opinion Issued in PCT Application No. PCT/US2020/057443", dated Feb. 23, 2021, 13 Pages.

* cited by examiner

700

1710 — EACH OF AT LEAST A FIRST ACCELERATION COMPONENT, A SECOND ACCELERATION COMPONENT, AND A THIRD ACCELERATION COMPONENT SYNCHRONIZING A RESPECTIVE CLOCK TO A COMMON CLOCK ASSOCIATED WITH AN ACCELERATION COMPONENT SELECTED FROM AMONG THE AT LEAST THE FIRST ACCELERATION COMPONENT, THE SECOND ACCELERATION COMPONENT, AND THE THIRD ACCELERATION COMPONENT

1720 — EACH OF THE AT LEAST THE FIRST ACCELERATION COMPONENT, THE SECOND ACCELERATION COMPONENT, AND THE THIRD ACCELERATION COMPONENT SCHEDULING DATA TRANSMISSION IN A NETWORK IN A MANNER SUCH THAT AT A PARTICULAR TIME IN REFERENCE TO THE COMMON CLOCK EACH OF THE AT LEAST THE FIRST ACCELERATION COMPONENT, THE SECOND ACCELERATION COMPONENT, AND THE THIRD ACCELERATION COMPONENT IS SCHEDULED TO RECEIVE DATA FROM ONLY ONE OF THE FIRST ACCELERATION COMPONENT, THE SECOND ACCELERATION COMPONENT, OR THE THIRD ACCELERATION COMPONENT

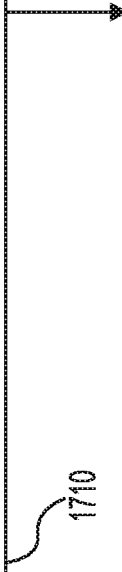

SYSTEMS AND METHODS FOR NODES COMMUNICATING USING A TIME-SYNCHRONIZED TRANSPORT LAYER

BACKGROUND

Increasingly, users access applications offered via computing, networking, and storage resources located in a data center. These applications run in a distributed computing environment, which is sometimes referred to as the cloud computing environment. Computer servers in a data center are interconnected via a network and thus the applications running on the computer servers can communicate with each other via the network. These servers may exchange messages with each other using various protocols. Because of the error prone nature of the distributed computing networks, the servers may implement retransmission of packets and other schemes to ensure the integrity of the message exchange. The addition of such techniques, however, may lower throughput.

Thus, there is a need for methods and systems that alleviate at least some of these issues.

SUMMARY

In one example, the present disclosure relates to a method in a network comprising at least a first node, a second node, and a third node. The method may include each of the at least the first node, the second node, and the third node synchronizing a respective clock to a common clock. The method may further include each of the at least the first node, the second node, and the third node scheduling data transmission in the network in a manner such that at a particular time in reference to the common clock each of the at least the first node, the second node, and the third node is scheduled to receive data from only one of the first node, the second node, or the third node.

In another example, the present disclosure relates to a system including a network configured to interconnect a plurality of acceleration components. The system may further include the plurality of acceleration components configurable to accelerate the at least one service, where each of the plurality of acceleration components is configured to synchronize a respective clock to a common clock associated with an acceleration component selected from among the plurality of acceleration components, and where each of the plurality of acceleration components is configured to transmit data in the network in a manner such that at a particular time in reference to the common clock each of the plurality of acceleration components is scheduled to receive data from only one of the plurality of acceleration components.

In yet another example, the present disclosure relates to a method in a network comprising at least a first acceleration component, a second acceleration component, and a third acceleration component. The method may include each of the at least the first acceleration component, the second acceleration component, and the third acceleration component synchronizing a respective clock to a common clock associated with an acceleration component selected from among the at least the first acceleration component, the second acceleration component, and the third acceleration component. The method may further include each of the at least the first acceleration component, the second acceleration component, and the third acceleration component scheduling data transmission in the network in a manner such that at a particular time in reference to the common clock each of the at least the first acceleration component, the second acceleration component, and the third acceleration component is scheduled to receive data from only one of the first acceleration component, the second acceleration component, or the third acceleration component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 17 shows a flow chart of a method for exchange of messages among acceleration components using the TSL protocol in accordance with one example.

DETAILED DESCRIPTION

Figure 1:
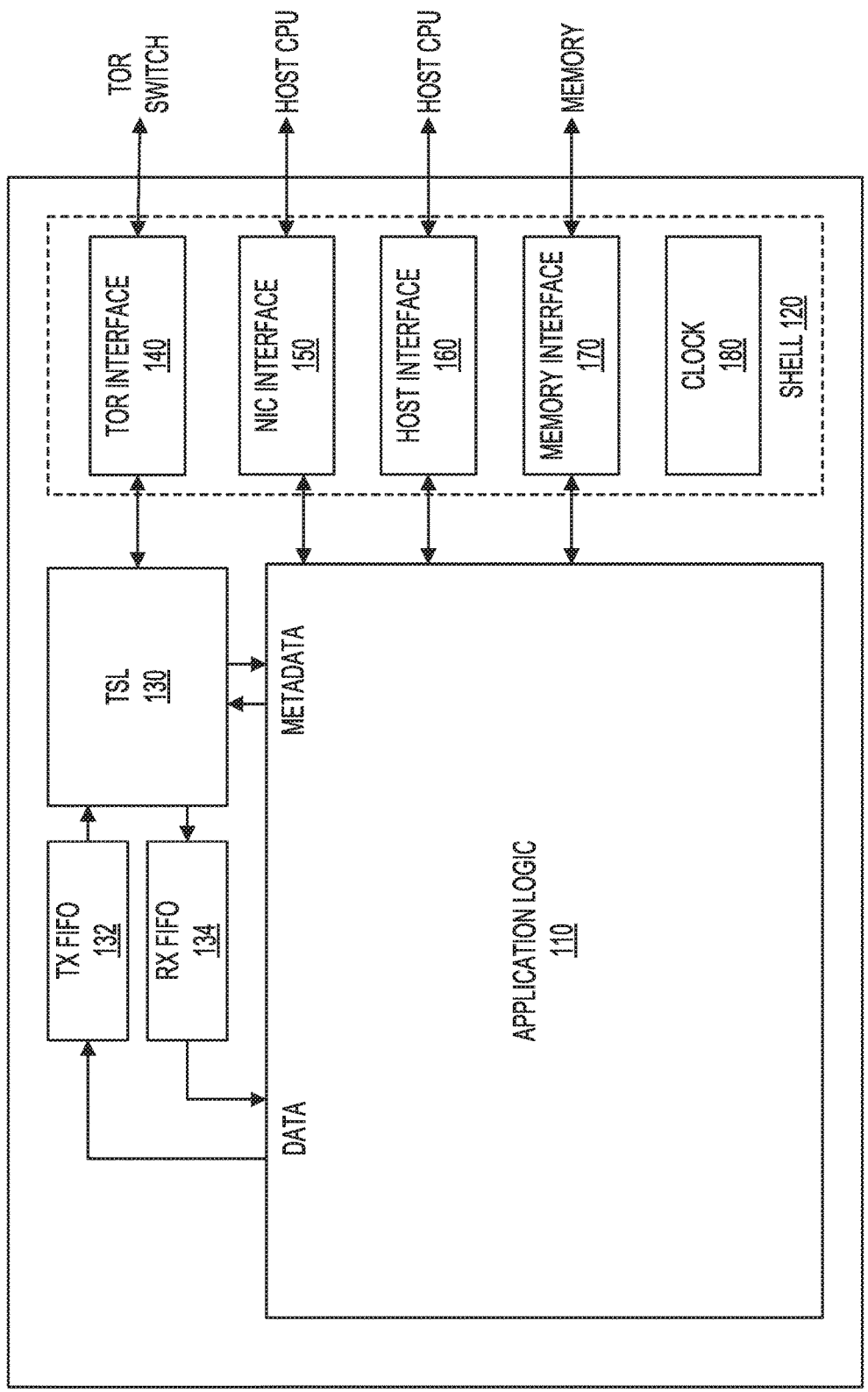
FIG. 1 shows a diagram of an acceleration component including a time-synchronized transport layer (TSL) component in accordance with one example.

Examples described in this disclosure relate to methods and systems that provide for transmission of messages among nodes (e.g., nodes including acceleration components configurable to accelerate a service). Certain examples relate to methods and systems that use a time-synchronized transport layer (TSL) protocol. The TSL protocol is aimed to minimize the overall time to transmit a massive amount of data in a dense communication pattern (for example, all-to-all broadcast) on a highly reliable network. In broad terms, for proper functioning, an example of the TSL protocol may require data integrity, including almost no packet drops or bitflip errors in the network links, and end-to-end ordered delivery of messages. The TSL protocol may work well when certain aspects related to delay, bandwidth, and external packets are met. In terms of the delay, the TSL protocol may work well if the end-to-end delay between nodes is near constant and there is similar delay between each pair of nodes configured to send/receive messages. With respect to bandwidth, the network switches may support the maximum possible bandwidth on all ports simultaneously when there is no link congestion. The TSL protocol may also work well when there are infrequent non-TSL (or external) packets. Even if all of these properties do not hold, the TSL protocol may be configured to tolerate deviations. Given a network that satisfies the aforementioned prerequisites, the TSL protocol is able to synchronize all participating nodes (e,g., acceleration components) and run a statically scheduled (or dynamically scheduled) data transmission, so that data packets from different senders do not interleave on the receiver side. This eliminates link congestions and data packet retransmissions, as well as significantly reduces the number of necessary control messages such as ACKs and data retransmissions.

The TSL protocol may achieve near-peak link utilization for collective communication by employing Time Division Multiplexing (TDM) techniques on top of a conventional packet-switched datacenter network. In certain examples, the fine-grain time synchronization and the explicit coordination of all participating endpoints to avoid conflicts during data transmission improves the link utilization of the links among the nodes. The TSL protocol characterizes network latency at runtime to keep all participating endpoints synchronized to a global clock and then schedules data transmissions across multiple communicating endpoint pairs to achieve conflict-free full-bandwidth use of the available network links. The TSL protocol may perform best in controlled network environments (e.g., high-performance backend networks) where all endpoints under a TOR or higher-level set of T1/T2 switches participate in the protocol and are coordinating their communication. The TSL protocol is advantageously robust against small latency variations and clock drifting of participating nodes but to minimize hardware overhead and take advantage of the highly reliable and predictable nature of modern datacenter networks, the TSL protocol may forgo hardware logic needed for re-transmission, re-ordering and re-assembly with a simple fail-stop mechanism or the delegation of the recovery to higher-level software mechanisms.

An acceleration component includes, but is not limited to, a hardware component configurable (or configured) to perform a function corresponding to a service being offered by, for example, a data center more efficiently than software running on a general-purpose central processing unit (CPU). Acceleration components may include Field Programmable Gate Arrays (FPGAs), Graphics Processing Units (GPUs), Application Specific Integrated Circuits (ASICs), Erasable and/or Complex programmable logic devices (PLDs), Programmable Array Logic (PAL) devices, Generic Array Logic (GAL) devices, and massively parallel processor array (MPPA) devices. An image file may be used to configure or re-configure acceleration components such as FPGAs. Information included in an image file can be used to program hardware components of an acceleration component (e.g., logic blocks and reconfigurable interconnects of an FPGA) to implement desired functionality. Desired functionality can be implemented to support any service that can be offered via a combination of computing, networking, and storage resources such as via a data center or other infrastructure for delivering a service.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

A data center deployment may include a plurality of networked acceleration components (e.g., FPGAs) and a plurality of networked software implemented host components (e.g., central processing units (CPUs)). A network infrastructure can be shared among the acceleration components and the host component. Each host component may correspond to a server computer that executes machine-readable instructions using one or more central processing units (CPUs). In one example, these instructions may correspond to a service, such as a text/image/video search service, a translation service, or any other service that may be configured to provide a user of a device a useful result Each CPU may execute the instructions corresponding to the various components (e.g., software modules or libraries) of the service. Each acceleration component may include hardware logic for implementing functions, such as, for example, portions of services offered by a data center.

In some environments, software-implemented host components are locally linked to corresponding acceleration components. Acceleration components may communicate with each other via a network protocol. To provide reliable service to a user of the service being offered via a data center, any communication mechanisms may be required to meet certain performance requirements, including reliability. In certain examples, the present disclosure provides for a lightweight transport layer for meeting such requirements. In one example, the acceleration components may communicate with each other via a network. Each acceleration component may include hardware logic for implementing functions, such as, for example, portions of services offered by a data center. An acceleration component may perform operations using several parallel logic elements to perform computational tasks. As an example, an FPGA may include several gate arrays that may be configured to perform certain computational tasks in parallel. Thus, an acceleration component can perform some operations in less time compared to a software-driven host component. In the context of this disclosure, the "acceleration" reflects its potential for accelerating the functions that are performed by the host components.

FIG. 1 shows a diagram of an acceleration component 100 including a time-synchronized transport layer (TSL) component 130 in accordance with one example. Components included in acceleration component 100 can be implemented on hardware resources (e.g., logic blocks and programmable interconnects) of acceleration component 100. Acceleration component 100 may include application logic 110 and shell 120. The application domain hosts application logic 110 that performs service specific tasks (such as a portion of functionality for ranking documents, encrypting data, compressing data, facilitating computer vision, facilitating speech translation, machine learning, etc.). Shell 120 may be associated with resources corresponding to lower-level interface-related components that may generally remain the same across many different application scenarios. Application logic 110 may be further conceptualized as including an application domain (e.g., a "role"). The application domain or role can represent a portion of functionality included in a composed service spread out over a plurality of acceleration components. Roles at each acceleration component in a group of acceleration components may be linked together to create a group that provides the service acceleration for the application domain.

In operation, in this example, application logic 110 may interact with the shell resources in a manner analogous to the way a software-implemented application interacts with its underlying operating system resources. From an application development standpoint, the use of common shell resources frees a developer from having to recreate these common components for each service.

Application logic 110 may further be coupled with TSL component 130 via a transmit (TX) FIFO 132 for transmission of data to TSL component 130 and a receive (RX) FIFO 134 for reception of data from TSL component 130. Application logic 110 may further exchange metadata with TSL component 130. In this example, metadata may include transmit (TX) metadata and receive (RX) metadata. TX metadata may include a destination ID, which may identify a specific acceleration component and payload size. RX metadata may include a source ID, which may identify a specific acceleration component and payload size. Additional details concerning the metadata and the operation of TSL component 130 are provided later.

Shell resources included in shell 120 may include a TOR interface 140 for coupling acceleration component 100, a network interface controller (NIC) interface 150, a host interface 160, a memory interface 170, and a clock 180. TOR interface 140 may further be coupled to TSL component 130. NIC interface 150 may be coupled to application logic 110. Data paths may allow traffic from the NIC or TOR to flow into acceleration component 100, and traffic from the acceleration component 100 to flow out to the NIC or TOR.

Host interface 160 may provide functionality that enables acceleration component 100 to interact with a local host component (not shown). In one implementation, the host interface 160 may use Peripheral Component Interconnect Express (PCIe), in conjunction with direct memory access (DMA), to exchange information with the local host component. Memory interface 170 may manage the interaction between the acceleration component 100 and a local memory (such as DRAM memory).

As noted earlier, shell 120 may further include clock 180. Clock 180 may include signal generators, including oscillators, and phase-lock loops (PLLs), as needed. Clock 180 may further include hardware/software to allow clock 180 to update its time and thus correct any differences from the time managed by the other clocks. Clock 180 may provide timing information to TSL 130 and other components of acceleration component 100. Shell 120 may also include various other features, such as status LEDs, error correction functionality, and so on.

A plurality of acceleration components like acceleration component 100 can be configured to act in concert to accelerate a service. Acceleration components can use different network topologies to communicate with one another. Although FIG. 1 shows a certain number of components of acceleration component 100 arranged in a certain manner, there could be more or fewer number of components arranged differently. In addition, various components of acceleration component 100 may be implemented using other technologies as well.

Figure 2:
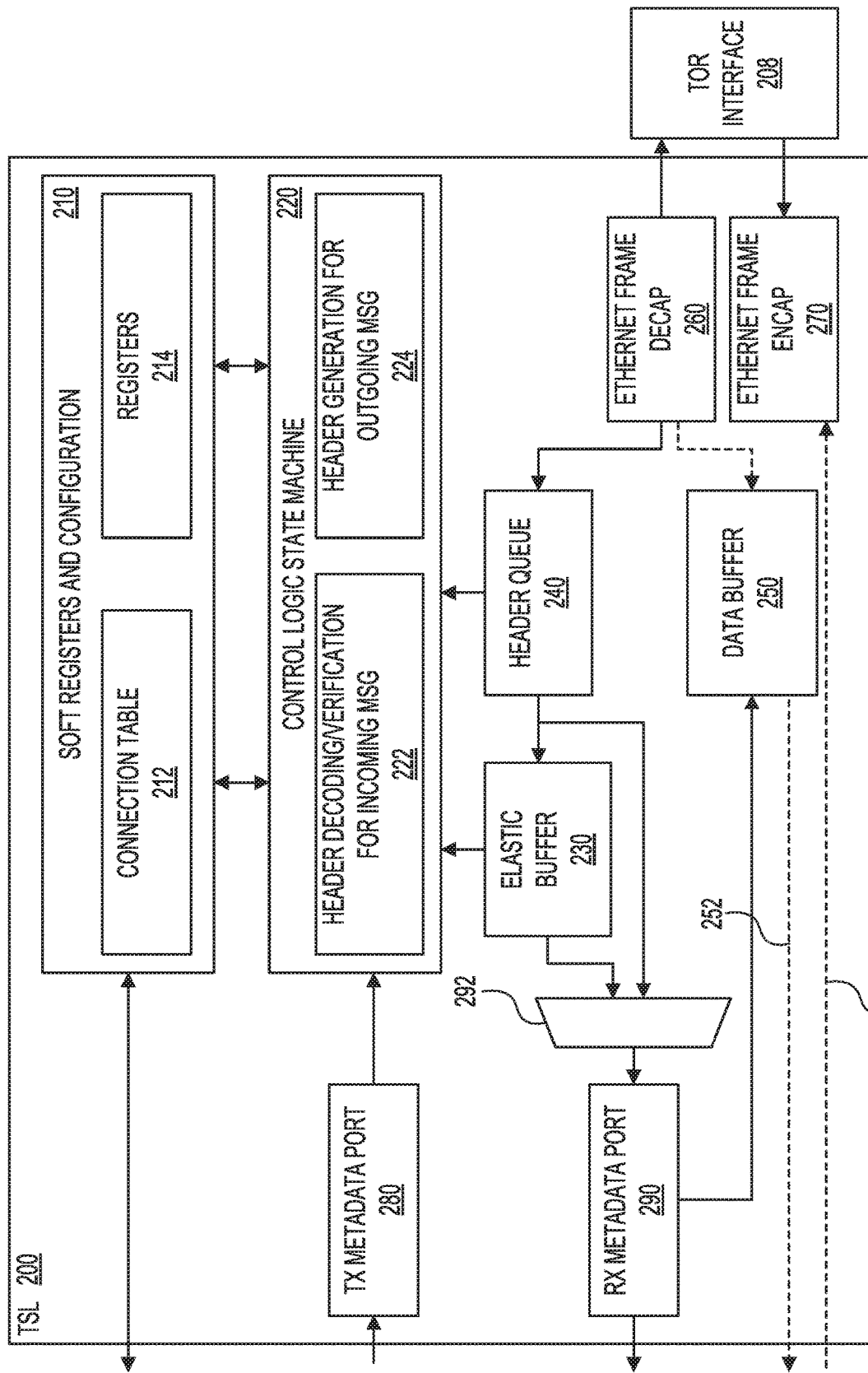
FIG. 2 shows a diagram of a TSL component in accordance with one example.

FIG. 2 shows a diagram of a TSL component 200 in accordance with one example. TSL component 200 may implement the time-synchronized transport layer protocol. TSL component 200 may transmit and receive data via TOR interface 208. In one example, TOR interface 208 may be implemented as a 100 Gigabit MAC interface. TSL component 200 may include soft registers and configuration 210, control logic state machine 220, elastic buffer 230, header queue 240, data buffer 250, Ethernet frame decapsulation 260, Ethernet frame encapsulation 270, TX metadata port 280, RX metadata port 290, and multiplexer 292. Soft registers and configuration 210 may include a connection table 212 and registers 214. Connection table 212 may include information concerning MAC and IF addresses of the node (e.g., an acceleration component or another type of endpoint). Connection table 212 may further include information concerning heartbeat data (described later) and any errors related data. Table 1 below shows example data structures that may be used to set up a connection table.

TABLE 1

```
// TSL Connection Table Entry Header (RW from SoftReg, RO from
within TSL, NOT reset by soft-reset)
typedef struct packed {
  logic valid; // if this entry is valid or not
  // connection info
  EthMAC mac; // MAC Address of the node stored in this entry
  IPAddress ip; // IP Address of the node stored in this entry
} TSLCTEHeader;
// TSL Connection Table Entry Payload (RO from SoftReg,
RW from within
TSL, reset by soft-reset
typedef struct packed {
// heartbeat/data frame info
  logic acked; // previously sent heartbeat is already acknowledged
  TSLSeqID seq_sent; // sequence ID of the latest heartbeat
sent to that node
  TSLTimestamp timestamp; // time when the latest heartbeat was sent
  // stats
  TSLTimeErrorAccumulator acc_delay; // accumulated delay value
  TSLStatsCounter cnt_delay; // # of delay values accumulated
```

As an example, if a network of acceleration components includes three acceleration components, then each of these acceleration components may include a copy of the data structure shown in Table 1. The payload portion of the data structure may be used to characterize the network latency from a node (e.g., an acceleration component) to another node. Control logic state machine 220 may be configured based on the payload. As explained later, the heartbeat corresponds to a message that is sent during the characterization phase and the standby phase of the protocol. In this example, the heartbeat message may be used to measure the time difference and pair-wise latency to keep the nodes in the network synchronized with each other, as needed.

In one example implementation, the contents of the connection table (e.g., connection table 212) may be the same regardless of whether the acceleration component is in a transmitting phase or a receiving phase. In addition, although Table 1 shows certain contents of the data structures that may be used to set up connection tables, other methods may be used.

Registers 214 may be used to store configuration information concerning the acceleration component. Table 2 below shows one example of a data structure (in this example, in Verilog format) that can be used to generate the configuration information for the acceleration component.

TABLE 2

```
// TSL Configuration (RW from SoftReg, RO from within TSL,
NOT reset by soft-reset)
typedef struct packed {
  TSLCTI self; // CTI of this node in the connection table
  TSLCTI master; // CTI of the master node in the connection table
  EthMAC mac; // MAC address of this node
  IPAddress ip; // IP address of this node
  IPDSCP dscp; // DSCP field in the IP header
  UDPPort port; // UDP source & destination port
  TSLConfigurationLog2 log2_hb_characterize; // log2(min # of
heartbeats needed to characterize pairwise delay)
  TSLConfigurationLog2 log2_frames_per_mega_cycle; // log2(# of
jumbo frames per mega-cycle for data transfer)
  TSLConfigurationLog2 log2_margin_multiplier; // margin =
(avg(delay) << 'log2(margin_multiplier)') + (var(delay) << 2)
  TSLConfigurationLog2 log2_heartbeat_interval; // log2(# cycles
between heartbeats)
  TSLConfigurationLog2 log2_timeout_multiplier; // timeout =
avg(delay) << log2(timeout_multiplier)
  TSLConfigurationLog2 log2_prep_multiplier; // preparation time
before mega-cycle start
  TSLFramePayloadSize frame_payload; // frame payload in bytes
  TSLTimeDiff est_cycles_per_frame; // estimated cycles per jumbo
frame
} TSLConfiguration;
```

In this example implementation, each node may have a unique connection table index (CTI). The value associated with the CTI may be used to read the connection table for the particular node. Each node may also include a CTI for the master node, which is described in the context of the TSL protocol later.

In this example, using the configuration parameters, the behavior of the TSL protocol may be customized for different network setups. As an example, by varying the number of the heartbeat messages needed to characterize the pairwise delay among the nodes, the protocol may be customized for a faster network or a slower network. In addition, increased efficiency may be realized by configuring the use of jumbo Ethernet frames for data, such that more than 1500 bytes per frame may be sent and received by the nodes in the network.

Control logic state machine 220 may be implemented in the logic associated with TSL component 200. As an example, control and other logic associated with control logic state machine 220 may be implemented as part of the FPGA that may be used to implement the acceleration component. Control logic state machine 220 may, in conjunction with connection table 212 and registers 214, control the behavior of an endpoint/node (e.g., an acceleration component). As an example, control logic state machine 220 may access the connection tables stored in a memory associated with TSL component 200 to determine the IP address of the node to which the data can be sent. As explained later, the TSL protocol may have phases and TSL component 200 may manage the transitions from one phase to the next.

Control logic state machine 220 may be configured to process various message types corresponding to the TSL protocol. As part of the TSL protocol, in one example, all messages may be encapsulated within IPv4/UDP frames. Table 3 below provides example message types and how they may be enumerated in Verilog logic.

TABLE 3

```
// Timesync Message Types
typedef enum logic [7:0] {
  TSL_MSG_RESERVED = 'h00
  TSL_MSG_HB = 'h10 // any -> others : heartbeat
  TSL_MSG_HB_ACK = 'h90 // any -> others: ack to
  TSL_MSG_STANDBY = 'h20 // any -> master: initialization
done
  TSL_MSG_STANDBY_ACK = 'hA0 // master -> any : ack to
TSL_MSG_STANDBY'
  TSL_MSG_PREP = 'h21 // master -> all: prepare for data
transfer phase
  TSL_MSG_PREP_ACK = 'hA1 // any -> master: ack to
TSL_MSG_PREP'
  TSL_MSG_PREP_CONFIRM = 'h22 // master -> all :
confirm data transfer
  TSL_MSG_SYNC = 'h30 // any -> master :
request to sync global time
  TSL_MSG_SYNC_ACK = 'hB0 // master -> any : ack to
TSL MSG_SYNC'
  TSL_MSG_TRX_DAT = 'h40 // any ->others : data transfer
  TSL_MSG_TRX_DAT_ACK = 'hC0 // any -> any : ack to
TSL_MSG_TRX_DAT'
  TSL_MSG_ERR = 'hFF // any -> all : something went wrong
} TSLMsgType;
```

Control logic state machine 220 may further provide header decoding/verification for an incoming message (MSG) 222 and header generation for an outgoing MSG 224. Header decoding may relate to decoding the message header and processing the information included in the header. Message headers may be included as part of the UDP payload. Table 4 below provides an example structure of a message header.

TABLE 4

```
// Timesync Message Header
typedef struct packed {
  TSLMsgType msg_type; // TSL message type
  logic [15:0] cti; // connection table index
  union packed {
    TSLSeqID hb; // TSL_MSG_HB & ACK: heartbeat sequence ID
    TSLSeqID standby; // TSL_MSG_STANDBY & ACK; standby
sequence ID
    TSLSeqID prep; // TSL_MSG_PREP & ACK & CONFIRM:
preparation sequence ID
    TSLSeqID sync; // TSL_MSG_SYNC & ACK: synchronization
sequence ID
    TSLSeqID data; // TSL_MSG_TRX_DAT & ACK: data frame
```

TABLE 4-continued

```
sequence ID
  } seq;
  union packed {
    TSLTimestamp hb_recvd; // TSL_MSG_HB_ACK: local time
when heartbeat is received
    TSLTimestamp avg_delay; // TSL_MSG_STANDBY: maximum
average delay
    TSLTimestamp mc_start; // TSL_MSG_PREP_CONFIRM:
sync'ed time to start data transfer
    logic [63:0] seq_mc; // TSL_MSG_TRX_DAT & ACK: mega-
cycle ID
  } t0;
  union packed {
    TSLTimestamp hb_sent; // TSL_MSG_HB_ACK; local time
when heartbeat ack is sent
    TSLTimestamp min_delay; // TSL_MSG_STANDBY: minimum
delay
    TSLTimestamp mc_period; // TSL_MSG_PREP_CONFIRM:
period of mega-cycles
    logic [63:0] bytes_left; // TSL_MSG_TRX_DAT: bytes left in
this mega-cycle (inc. this frame)
    logic [63:0] bytes_recvd; // TSL_MSG_TRX_DAT_ACK: bytes
received in this mega-cycle
  } t1;
} TSLHeader;
```

Control logic state machine 220 may further be configured to keep track of other aspects, including bookkeeping aspects. Table 5 below shows an example data structure for storing bookkeeping aspects of the TSL protocol.

TABLE 5

```
// TSL bookkeeping
typedef struct packed {
  // time for next mega-cycle
  TSLTimestamp mc_timestamp;
  // timestamp for synchronization
  TSLTimestamp sync_timestamp;
  // data transfer phase setup
  union packed {
    TSLSeqID prep; // the mega-cycle proposal sequence ID
    TSLSeqID sync; // the synchronization sequence ID
    TSLSeqID standby; // the standby sequence ID
  } seq;
  // data transfer phase book keeping
  // sending-side
  TSLMCID mc_sent; // sending-side mega-cycle ID
  TSLSeqID seq_sent; // sending-side sequence ID
  TSLMCPayloadSize bytes_to_send; // number of bytes left to send
  TSLMCID mc_ack; // expected ACK mega-cycle ID
  TSLSeqID seq_ack; // expected ACK sequence ID
  // receiving-side
  TSLMCID mc_recv; // receiving-side mega-cycle ID
  TSLSeqID seq_recv; // receiving-side sequence ID
  TSLCTI sender_cti; // who is sending to me (default to "self,"
indicating no one is sending to me)
  TSLMCPayloadSize bytes_recvd; // total number of bytes received
  TSLMCPayloadSize bytes_to_recv; // number of bytes left to be
received
} TSLBookkeeping;
```

As an example, as shown in Table 5 above, the bookkeeping aspects may relate to keeping track of time stamps and data transfer sequences. For a sending node, the bookkeeping aspects may further include the megacycle ID, the sequence ID, and the number of bytes remaining to be sent. For a receiving node, the bookkeeping aspects may further include the megacycle ID, the sequence ID, the number of bytes still to be received, and the identity of the sending node. In other implementations, fewer or more bookkeeping aspects may be included.

Ethernet frames (e.g., jumbo Ethernet frames) may be provided to TSL component 200 via TOR interface 208. Ethernet frames may be decapsulated via Ethernet frame decap 260. Table 6 below shows an example jumbo frame header that includes the TSL header (e.g. the TSL header shown in Table 4 above). The jumbo frame header may be decapsulated by Ethernet frame decap 260.

TABLE 6

```
// Timesync Ethernet Jumbo Frame Header (512b)
typedef struct packed {
  EthernetHeader eth;
  IPV4Header ip;
  UDPHeader udp;
  TSLHeader tsl;
} TSLEthernetHeader;
```

The decapsulation may result in the extraction of the TSL message headers that may be buffered in header queue 240. Header queue 240 may provide the headers to control logic state machine 220, which may process them as described earlier. Header queue 240 may also provide the headers to elastic buffer 230. The functionality associated with elastic buffer 230 and multiplexer 292 is explained later.

The data extracted as a result of the decapsulation of the jumbo Ethernet frames may be buffered in data buffer 250, which may output the data via bus 252 to the application logic associated with the acceleration component. Data received from the application logic via bus 254 may be provided to Ethernet frame encap 270, which may encapsulate the data into jumbo Ethernet frames and provide them to TOR interface 208.

Application logic (e.g., application logic 110 included as part of acceleration component 100) may further interact with TSL component 200 via TX metadata port 280 and RX metadata port 290. Application logic may send metadata information for transmission to application logic residing in another node via TX metadata port 280. Application logic may receive metadata information from the application logic residing in another node via RX metadata port 290. As an example, metadata may include information concerning transmission or reception schedule for the nodes participating in accelerating the service. As an example, the schedule may include information indicating to TSL component 200 who in the next megacycle may send data to which node and the extent of that data. If the node is a receiving node, then the schedule may include the amount of data the receiving node should expect to receive in the next megacycle and the identity of the sending node(s). Any other instructions or metadata could also be exchanged via the metadata ports. Although FIG. 2 shows a certain number of components of TSL component 200 arranged in a certain manner, there could be more or fewer number of components arranged differently.

Figure 3:
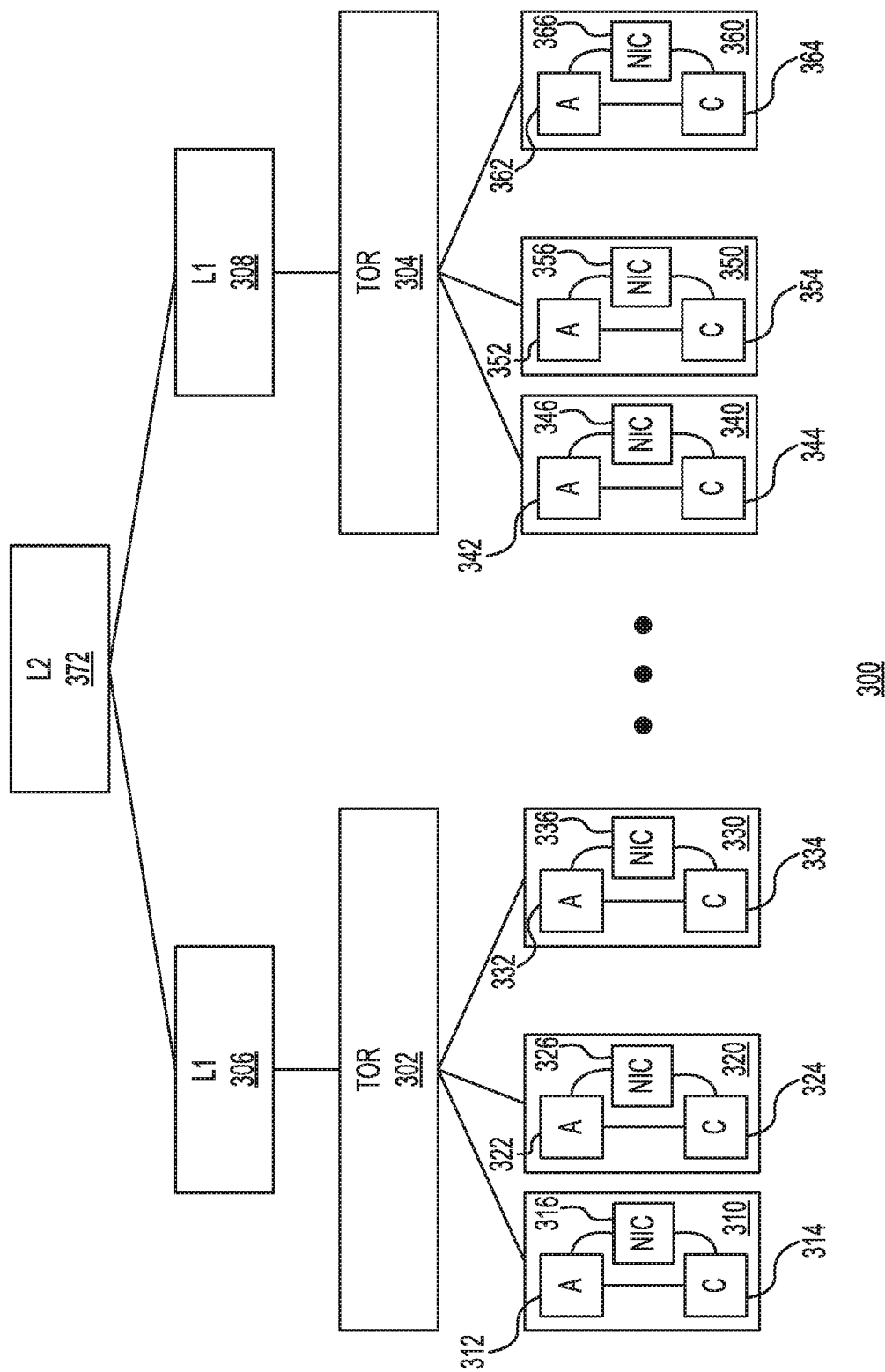
FIG. 3 shows a diagram of nodes in a network for transmission of messages using the TSL protocol in accordance with one example.

FIG. 3 shows a diagram of nodes in a network 300 for transmission of messages using the TSL protocol in accordance with one example. In this example, nodes 310, 320, and 330 may be coupled to a Top of Rack (TOR) switch 302 and nodes 340, 350, and 360 may be coupled to another TOR switch 304. Each node may include an acceleration component (A), a CPU (C), and a network interface controller (NIC). As an example, node 310 may include an acceleration component (A) 312, a CPU (C) 314, and a network interface controller (N IC) 316; node 320 may include an acceleration component (A) 322, a CPU (C) 324, and a network interface controller (NIC) 326; and node 330 may include an acceleration component (A) 332, a CPU (C) 334, and a network interface controller (NIC) 336. Similarly, in this example, node 340 may include an acceleration component (A) 342, a CPU (C) 344, and a network interface controller (N IC)

346; node 350 may include an acceleration component (A) 352, a CPU (C) 354, and a network interface controller (NIC) 356; node 360 may include an acceleration component (A) 362, a CPU (C) 364, and a network interface controller (NIC) 366. Each acceleration component may correspond to acceleration component 100 of FIG. 1 and each of the acceleration components may include a TSL component 200 of FIG. 2. Each node may include only FPGAs and ASICs and may not include any CPUs. Any arrangement of hardware compute components may be used as part of the nodes in FIG. 3.

TOR switch 302 may be coupled to a Level 1 (L1) switch 306 and TOR switch 304 may be coupled to L1 switch 308. The Level 1 switches 306 and 308 may be coupled to a Level 2 switch 372. This is only an example arrangement. Other network topologies and structures may also be used to couple the nodes for communication via the TSL protocol. In this example, IP routing may be used for transmitting or receiving messages among TOR switches. Each node or a group of nodes may have a single "physical" IP address that may be provided by the network administrator. To distinguish between IP packets destined for the CPU from packets destined for an acceleration component, UDP packets, with a specific port to designate the acceleration component as the destination, may be used. As noted earlier, the nodes may use TSL protocol to communicate with each other.

Figure 4:
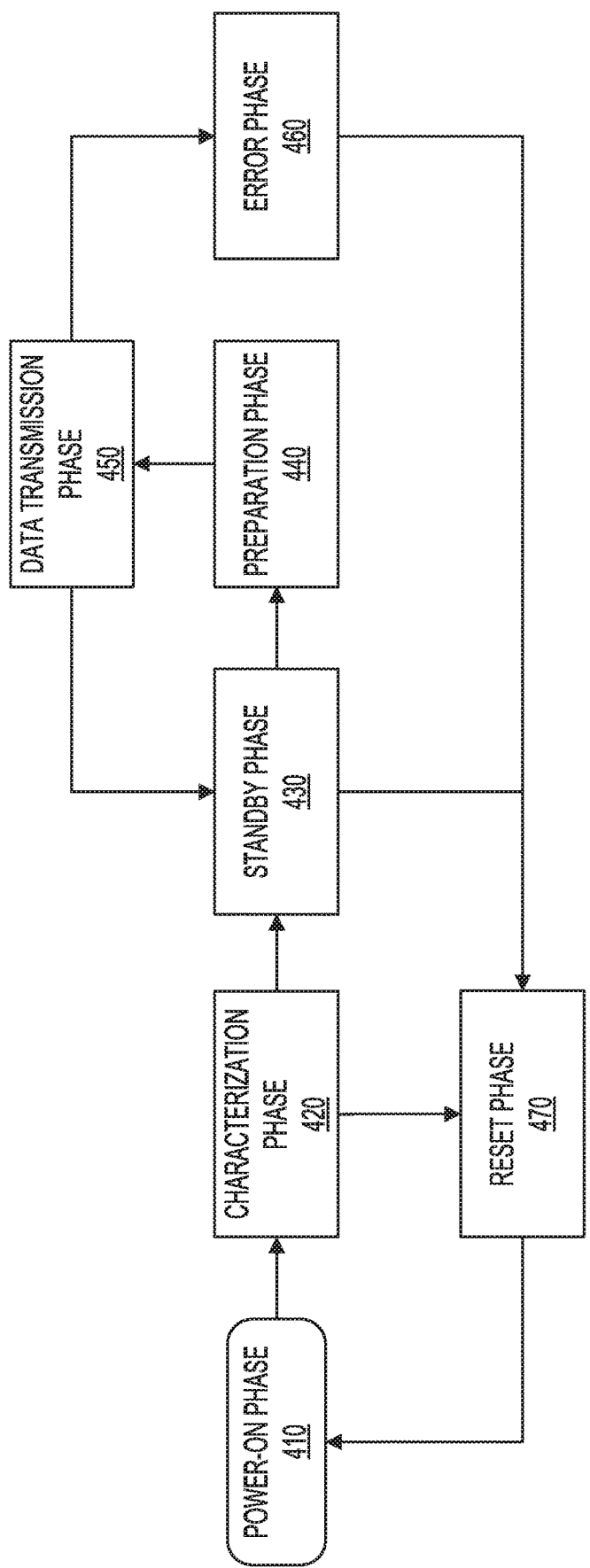
FIG. 4 shows a diagram of the phases associated with the TSL in accordance with one example.

The TSL protocol runs in phases 400 as shown in FIG. 4. Possible transitions among phases are indicated by arrows. Example phases 400 include power-on phase 410, characterization phase 420, standby phase 430, preparation phase 440, data transmission phase 450, error phase 460, and reset phase 470. In this example, all nodes start in the power-on phase 410. In this example, during this phase, each client (e.g., the application logic) on a node may configure its TSL component (e.g., TSL component 200) before enabling it. The configuration process may include setting up the MAC/IP addresses of all participating nodes, the UDP port they should use, the master node whose clock will be used as the global clock, and so on. In one example, during the characterization phase (explained later), the master node may be selected based on criteria for the clock associated with the nodes in the network. As an example, the node with a clock with the least amount of drift in time may be selected as the primary node. As explained earlier with respect to FIG. 2, the application logic may use the TX metadata port and the RX metadata port for configuring at least some of these aspects. Other aspects may be configured via connection tables and registers. In this example, the configuration should not be changed after the TSL protocol starts to run.

Figure 5:
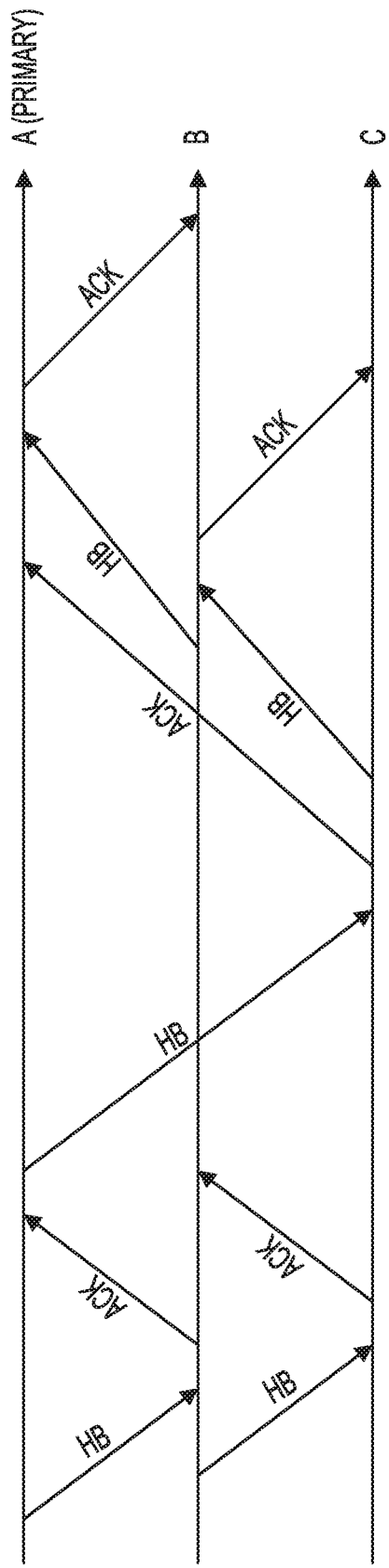
FIG. 5 shows an example exchange of messages among a primary node A, a node B, and another node C during the characterization phase of the TSL.

Characterization phase 420 may include measuring latencies associated with data transmission among the nodes in the network. As an example, a node A may characterize at least one latency value by sending a message to a node B, receiving the message back from node B, and measuring the time it took for this process. The latency values may be average, minimum, or maximum values. With continued reference to FIG. 4, in the characterization phase 420, each node may send HEARTBEAT messages to all other nodes periodically. Upon reception of a HEARTBEAT message, a node responds with a HEARTBEAT-ACK message. FIG. 5 shows an example exchange of messages 500 among a primary node A, node B, and node C during the characterization phase 420. Upon reception of a HEARTBEAT-ACK message, a node calculates the single-way delay between itself and the other node. In one example, assume the local time for a node is represented by t and the global time (the time maintained by the master node (e.g., primary node A)) is represented by T. Further, assume that a node (e.g., node B) sends a HEARBEAT/SYNC message to the master node (e.g., primary node A) at time t0, which is received by the master node at time T0. Moreover, assume that the master node responds by sending the HEARBEAT-ACK/SYNC-ACK message at time T1 and the node (e.g., node B) receives the HEARBEAT-ACK/SYNC-ACK message at time t1. Assuming near constant symmetric delay, let Δt=T−t be the difference between the global time and the local time, d be the single-way delay between the non-master node and the master node, and ε be the variation of delay, the single-way delay may be calculated by each node based on the equations below:

$$\begin{cases} T_0 - \Delta t = t_0 + d \pm \varepsilon \\ T_1 - \Delta t + d \pm \varepsilon = t_1 \end{cases}$$

$$\Rightarrow \begin{cases} \Delta t = \frac{1}{2}((T_0 - t_0) + (T_1 - t_1)) \pm \varepsilon \\ d = \frac{1}{2}((T_0 - t_0) - (T_1 - t_1)) \pm \varepsilon \end{cases}$$

Samples of delay may be accumulated until the number of samples reaches a threshold configured by the application logic (or a similar client). Average and minimum delay values may be recorded by the TSL component (e.g., as part of the bookkeeping data structures described earlier). In this example, this concludes the characterization of the link between two specific nodes. When a node finishes characterization of all links between itself and any other node, it takes the maximum of all the average delays, and the minimum of all the minimum delays, then sends a STANDBY message to the master node. Upon reception of a STANDBY message, the master node may update its own maximum of all average delays and minimum of all minimum delays, then it may respond with a STANDBY-ACK message. Upon reception of a STANDBY-ACK message, a non-master node may transition to the standby phase 430. After receiving STANDBY messages from all non-master nodes, the master node may transition to the standby phase 430. A client (e.g., the application logic) may reset the node during the characterization phase 420 and thereby transition the node into reset phase 470. Reset nodes may eventually transition back to the power-on phase 410.

Figure 6:
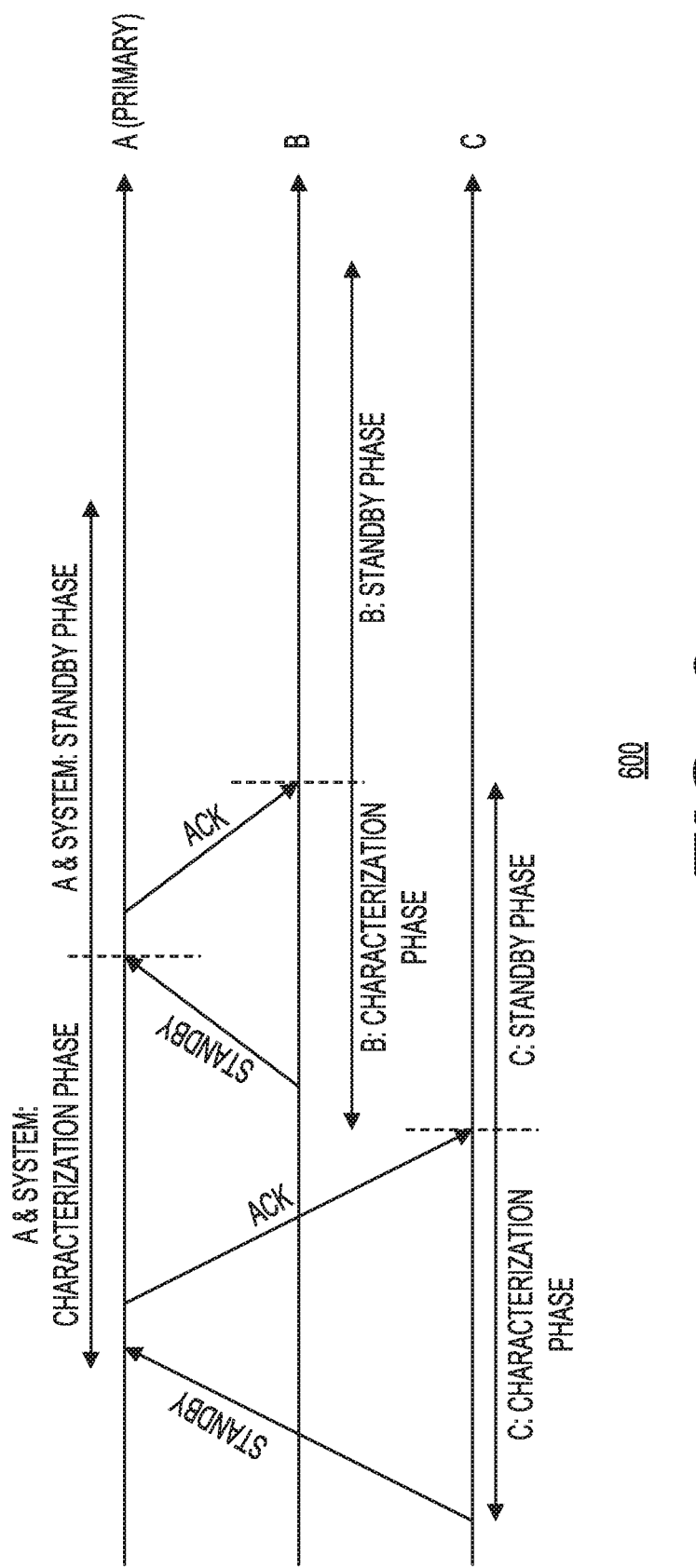
FIG. 6 shows an example exchange of messages among the primary node A, the node B, and the node C during the standby phase of the TSL.

Still referring to FIG. 4, once the TSL component associated with a node (e.g., an acceleration component) transitions to the standby phase 430, it is ready to transmit data. All nodes keep sending HEARTBEAT, HEARTBEAT-ACK, STANDBY, STANDBY-ACK messages the same way as they do during the characterization phase 420. FIG. 6 shows an example exchange of messages 600 among the primary node A, the node B, and the node C during the standby phase 430. A client may initiate data transmission on a node by sending metadata (e.g., via the TX metadata port 280). A node that receives such metadata may transition to the preparation phase 440. A client (e.g., the application logic) may reset the node during the standby phase 430 and thereby transitioning the node into reset phase 470. Reset nodes may eventually transition back to the power-on phase 410.

Figure 7:
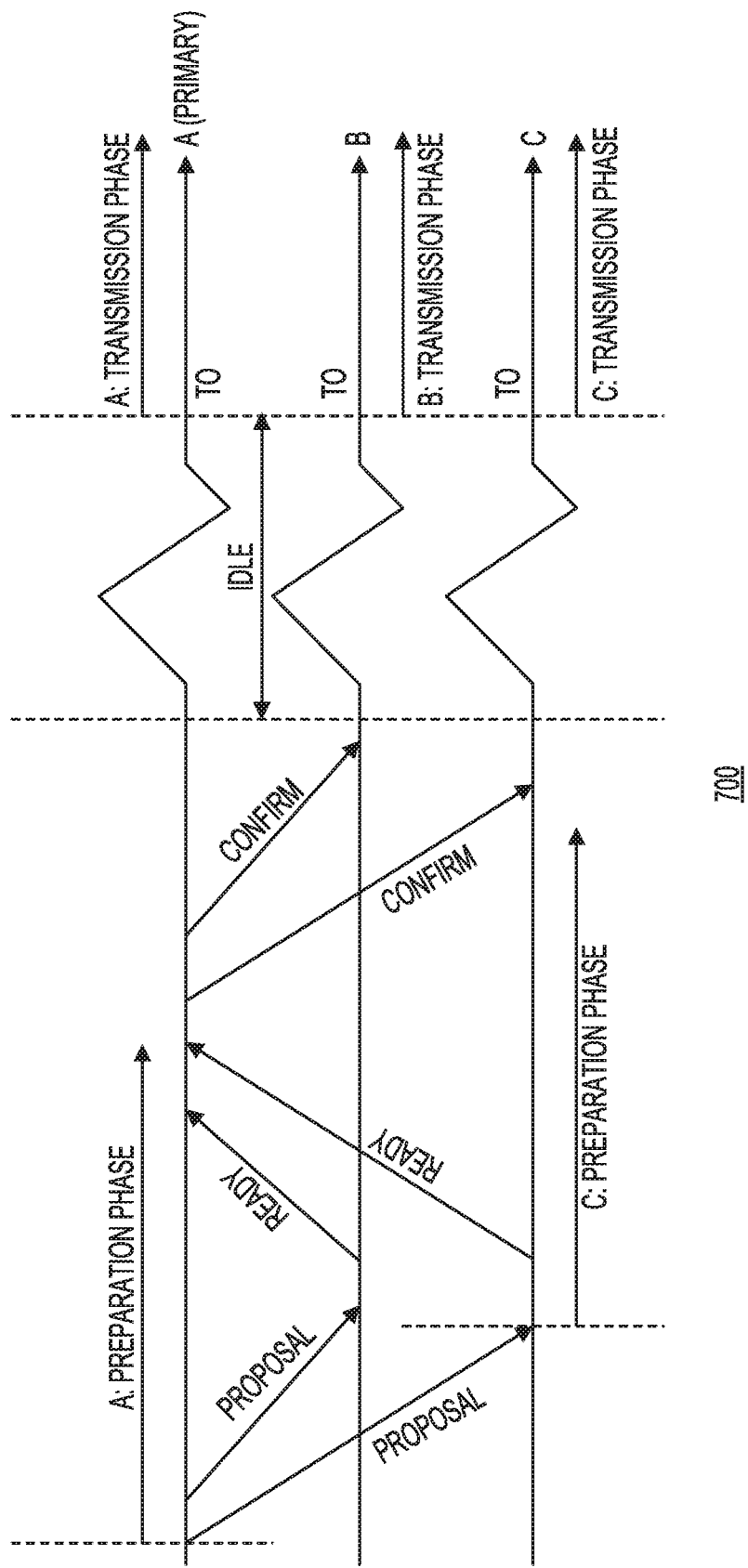
FIG. 7 shows an example exchange of messages among the primary node A, the node B, and the node C during the preparation phase of the TSL.

With continued reference to FIG. 4, during the preparation phase 440, the master node may send PROPOSAL messages to all of the non-master nodes. FIG. 7 shows an example exchange of messages 700 among the primary node A, the node, B, and the node C during the preparation phase 440. PROPOSAL message may contain two values. The first value may correspond to the global synchronized time when the data transmission mega-cycle starts. In one example, this is a time in the future, with enough time for all the nodes to synchronize before it comes. The other value may relate to the period of the mega-cycles. In this example, the period of the mega-cycles may be calculated based on the characterized distribution of the delay in the network, and a series of configurations modifiable during the power-on phase. As an example, the period of mega-cycles may be selected to be tight enough to keep all the links busy, but also loose enough to tolerate unexpected delay in the network. A timer may be enabled after the master node has sent out all PROPOSAL messages.

Upon reception of a PROPOSAL message, in this example, a node (e.g., node B) attempts to synchronize its local clock with the master node (e.g., primary node A shown in FIG. 7) by sending a SYNC message to the master node. The master node responds to the SYNC messages with the SYNC-ACK messages. Upon reception of a SYNC-ACK message, in this example, the node calculates the delay and local time difference between itself and the master. If the delay is beyond a configurable margin of the average delay, this attempt is abandoned, and the node sends a new SYNC message to the master node. Otherwise, the attempt is accepted. The node (e.g., node B) then updates its local clock, and, as shown in FIG. 7, sends a TX-READY message to the master node (e.g., primary node A).

If the master node has not received TX-READY messages from all non-master nodes when the timer times out, the proposal is abandoned. The master node sends out new PROPOSAL messages with a new TX-MC start time and period, then resets the timer. All non-master nodes resend SYNC messages and TX-READY messages when they receive a new PROPOSAL message. If the master node has received TX-READY messages from all non-master nodes before the timer times out, the proposal is accepted. As shown in FIG. 7, the master node (e.g., the primary node A) then sends PROPOSAL-CONFIRM messages to all non-master nodes to notify them that the proposal has been accepted. After that, all nodes stop sending messages so as to drain the network of the messages exchanged up to the preparation phase 440. All nodes transition to the data transmission phase 450 when they reach the specified mega-cycle start time. This transition happens at almost the same real-world time since all nodes have synchronized their local clocks with the master node.

Figure 8:
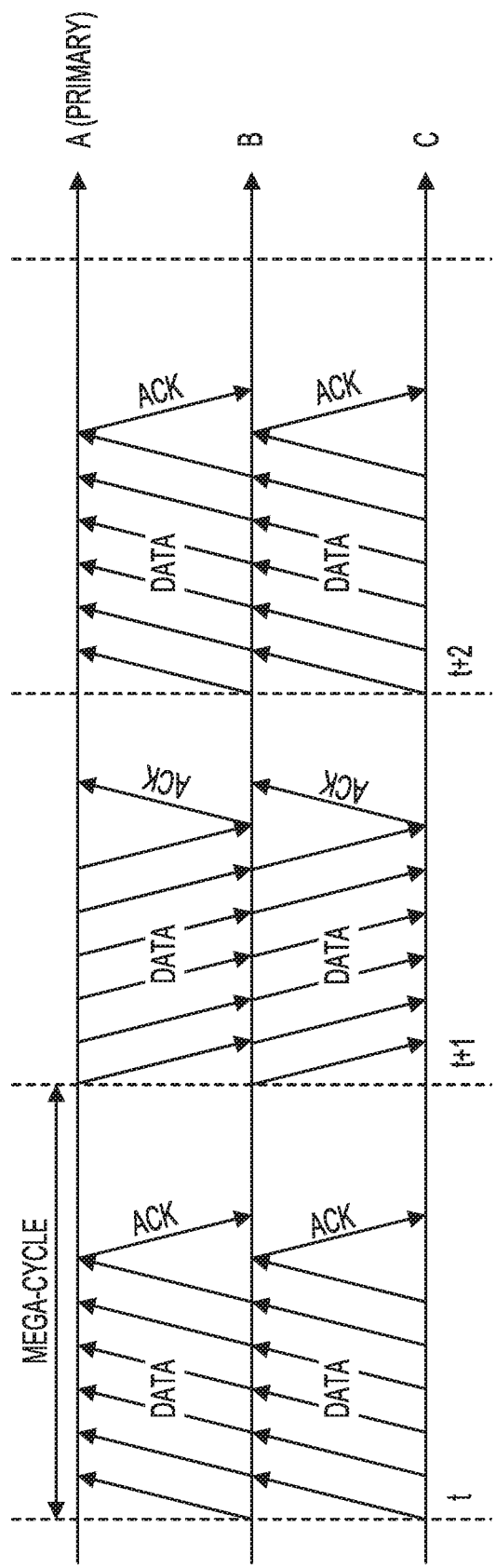
FIG. 8 shows an example exchange of messages and transmission of data among the primary node A, the node B, and the node C during the data transmission phase of the TSL.

FIG. 8 shows an example exchange of messages and transmission of data 800 among the primary node A, the node B, and the node C during the data transmission phase 450. As shown in FIG. 8, the data transmission phase 450 is sliced into data transmission mega-cycles (TX-MC). In each mega-cycle, a client (e.g. the application logic) may send a metadata to its own TSL component, indicating which node it wants to send data to, and how many bytes it wants to send. The maximum amount of data that can be sent in one mega-cycle is configured during the power-on phase 410. The client (e.g., the application logic) is responsible for feeding data fast enough to the TSL component so that the TSL component can finish sending data before the end of the current mega-cycle. During a mega-cycle, a node may send zero DATA messages or many DATA messages according to the metadata it receives. Each DATA message may encapsulate the information shown in Table 6 in its header.

TABLE 6

Sender's node ID
Mega-cycle (TX-MC) ID
Sequence ID of this DATA message in the current TX-MC
The amount of data to follow As shown in FIG. 8, in this example, after sending all of the DATA messages scheduled for the particular mega-cycle, the node waits until the local time reaches the end of the current mega-cycle (TX-MC) period, and then it starts the next mega-cycle. In this example, the mega-cycle keeps progressing until the client sends a "finish" metadata, or the node detects an error. In this example, the mega-cycle period only constrains a node as a sender. Correspondingly, a receive mega-cycle period (RX-MC) constrains a node as a receiver, but, in this example, there are no explicit time constraints for the RX-MC. Whenever a node that is not in a receive mega-cycle period (RX-MC) receives a DATA message which satisfies the following criteria: TX-MC ID is larger than the previously finished RX-MC ID and the sequence ID is 0, a new receive mega-cycle period (RX-MC) starts.

After the new receive mega-cycle period (RX-MC) starts, the node expects consecutive DATA messages from the same sender until the last DATA message arrives. When the last DATA message arrives, the current receive mega-cycle period (RX-MC) ends, and the node sends a DATA-ACK message to the sender node. The node also sends an RX metadata to the client upon reception of the last DATA message. If the node receives a DATA message that is not consecutive, it transitions to the error phase 460 and halts. The timeout of DATA-ACK messages results in all of the nodes transitioning to the error phase 460. Although FIG. 4 shows a certain number of phases, additional or fewer phases may be included as part of the TSL protocol.

Figure 9:
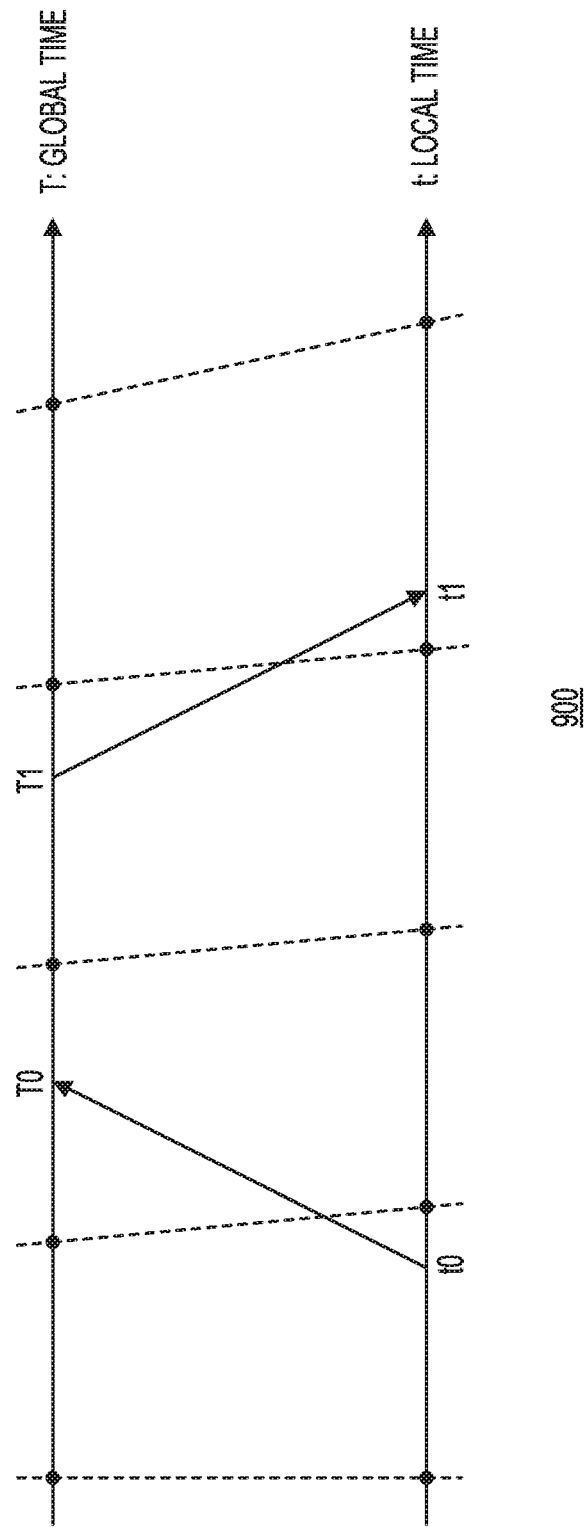
FIG. 9 shows the effect of time drifting on a local clock in relation to the master clock in accordance with one example.

FIG. 9 shows the effect of time drifting 900 on a local clock in relation to the master clock in accordance with one example. As shown in the figure above, since local time is counted separately on each node, and the clock on each node may drift over time, a synchronized node may gradually run out-of-sync with the master node. In addition, there may be non-TSL packets in the network (e.g., a broadcast of Ethernet frames when the switch does not know the MAC address of certain nodes). Non-TSL packets disturb the mega-cycle (TX-MC) schedules and increase the error when measuring the delay/time difference.

Figure 10:
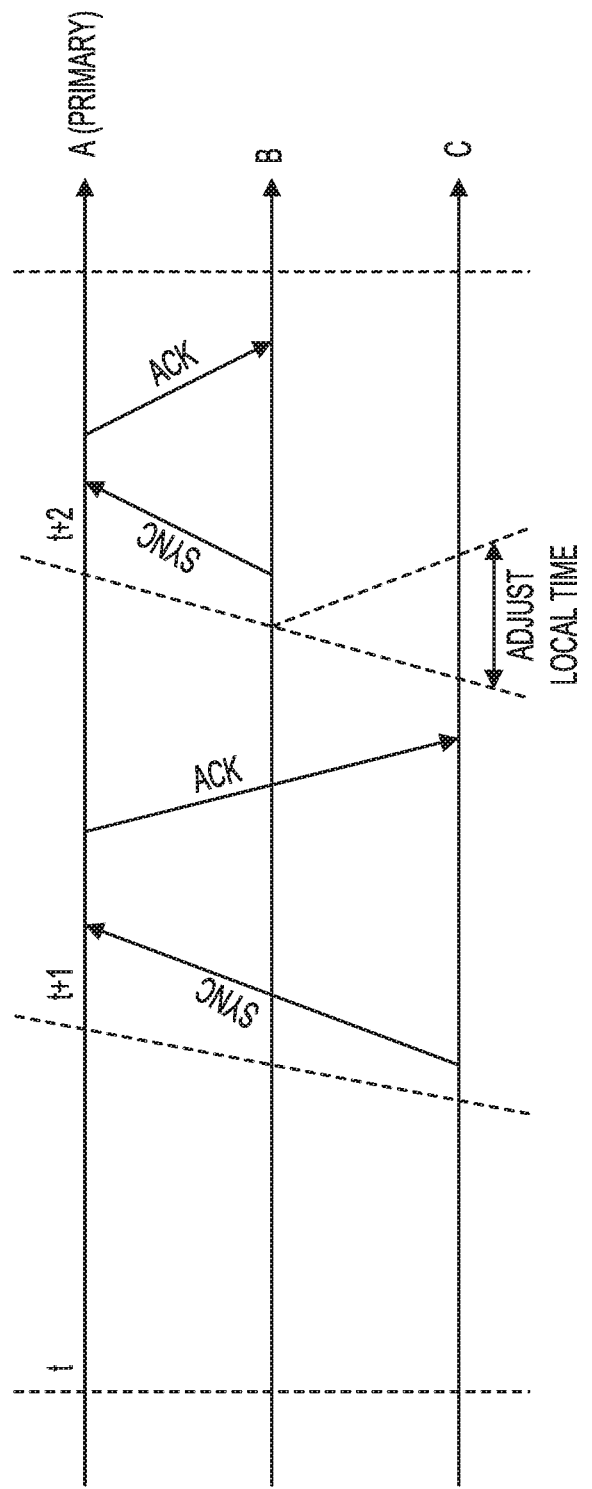
FIG. 10 shows an example exchange of synchronization messages among the primary node A, the node B, and the node C.

To keep the nodes in the network synchronized, as well as to tolerate the variations introduced by non-TSL packets, periodic re-syncs may be added to the TSL protocol. As shown via message exchanges 1000, in FIG. 10, at the end of each TX-MC, a non-master node (e.g., node B or node C) may send a SYNC message to the master node (primary node A) to re-synchronize. The example in FIG. 10 shows that clocks of both node B and node C were already starting to go faster than the global clock associated with the primary node A. In this example, the clock of node C is assumed to be much faster than the global clock (managed by the primary node A) and the clock of the node B is assumed to be a little bit faster than the global clock. In this example, during mega-cycle t+1, the node C synchronized its clock with the clock of the primary node A and during mega-cycle t+2, the node B synchronized its clock with the clock of the primary node A. In one example, to avoid saturating the ingress link of the master node, a non-master node sends SYNC messages only when the TX-MC ID is a multiple of its node ID.

Figure 11:
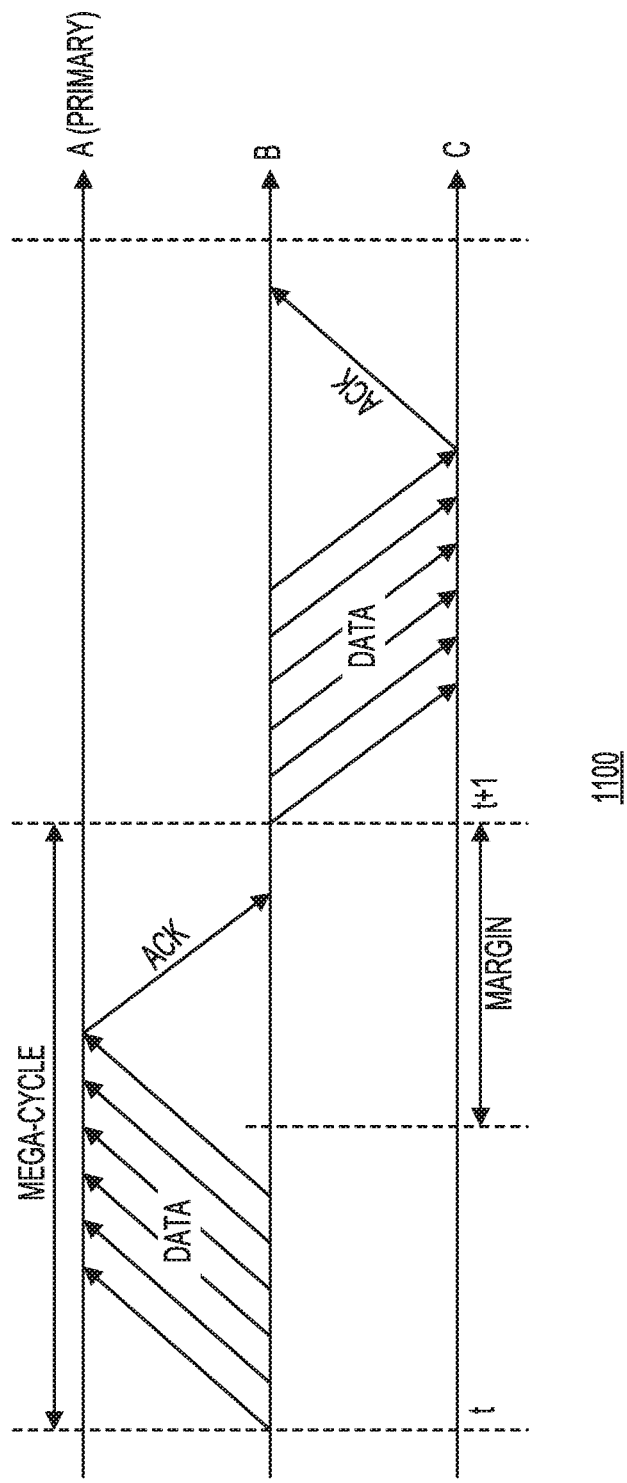
FIG. 11 shows margin from the perspective of messages sent and received by the node B in accordance with one example.

While resynchronization among the nodes may improve the performance of the TSL protocol, there may be other aspects that could be improved. As an example, FIG. 11 shows margin from the perspective of messages 1100 sent and received by the node B. The node B is waiting for the ACK message from the primary node A before starting the next mega-cycle. The time period between the last transmission from the node B to the primary node A and the receipt of the ACK message from the primary node B shows the inefficiency of maintaining the margin. This is because the node B is waiting to receive the ACK message from the primary node A before starting the data transmission to node C as part of the next mega-cycle.

Figure 12:
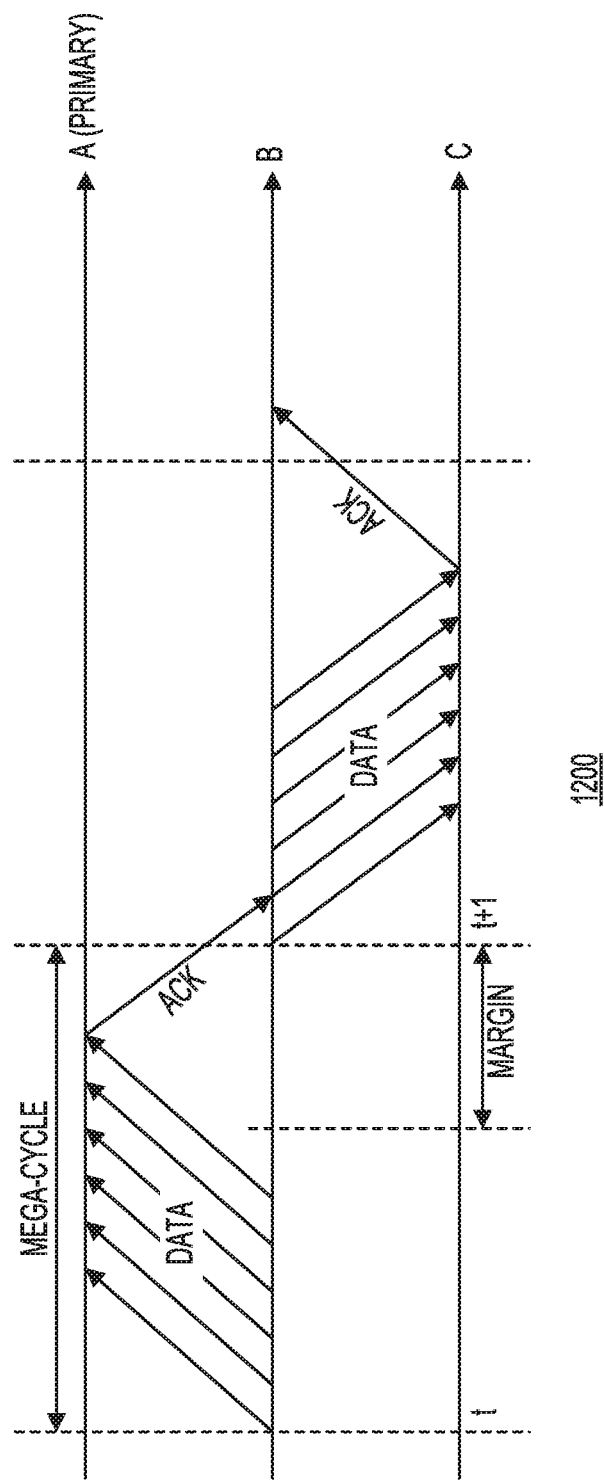
FIG. 12 shows the messages being sent and received by the node B in a manner to reduce the margin in accordance with one example.

One way to reduce the effect of the margin is shown in FIG. 12. Thus, FIG. 12 shows the messages 1200 being sent and received by the node B in a manner to reduce the margin. In this case, the node B does not wait to receive the ACK message from the primary node A and starts the transmission of the data for the next mega-cycle prior to receiving the ACK message.

Figure 13:
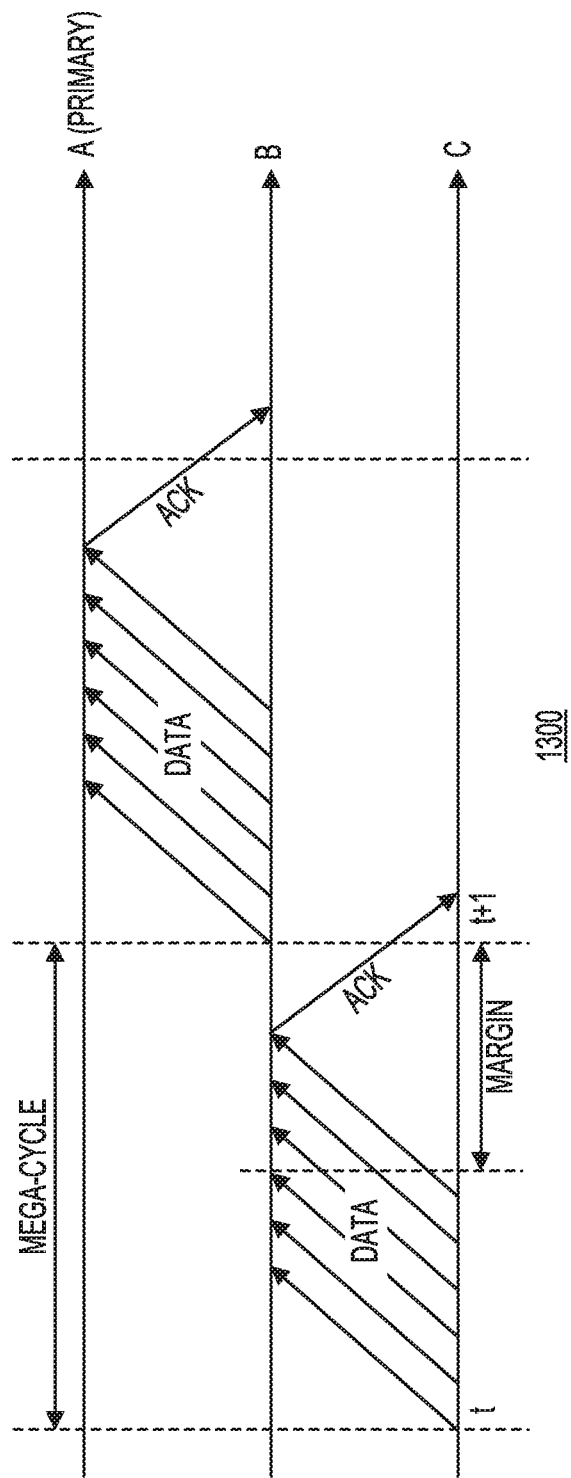
FIG. 13 shows another example of exchange of messages with the margin in accordance with one example.
Figure 14:
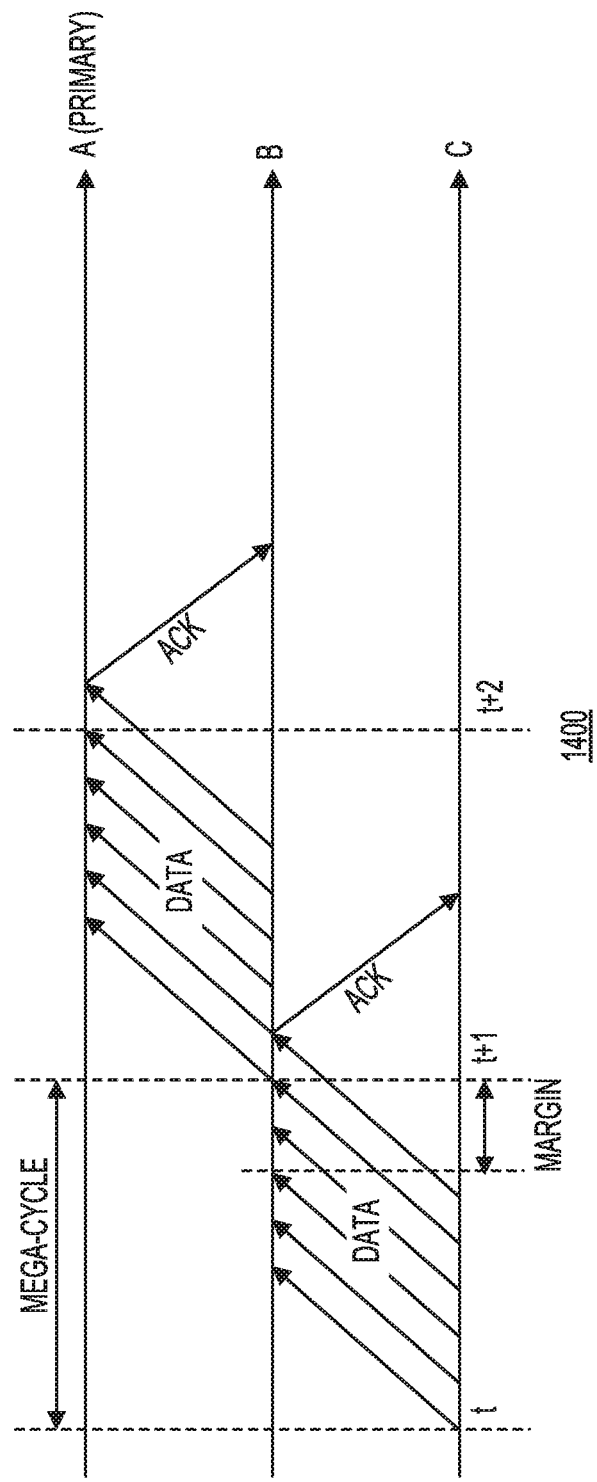
FIG. 14 shows another example of exchange of messages with an improved margin in accordance with one example.
Figure 15:
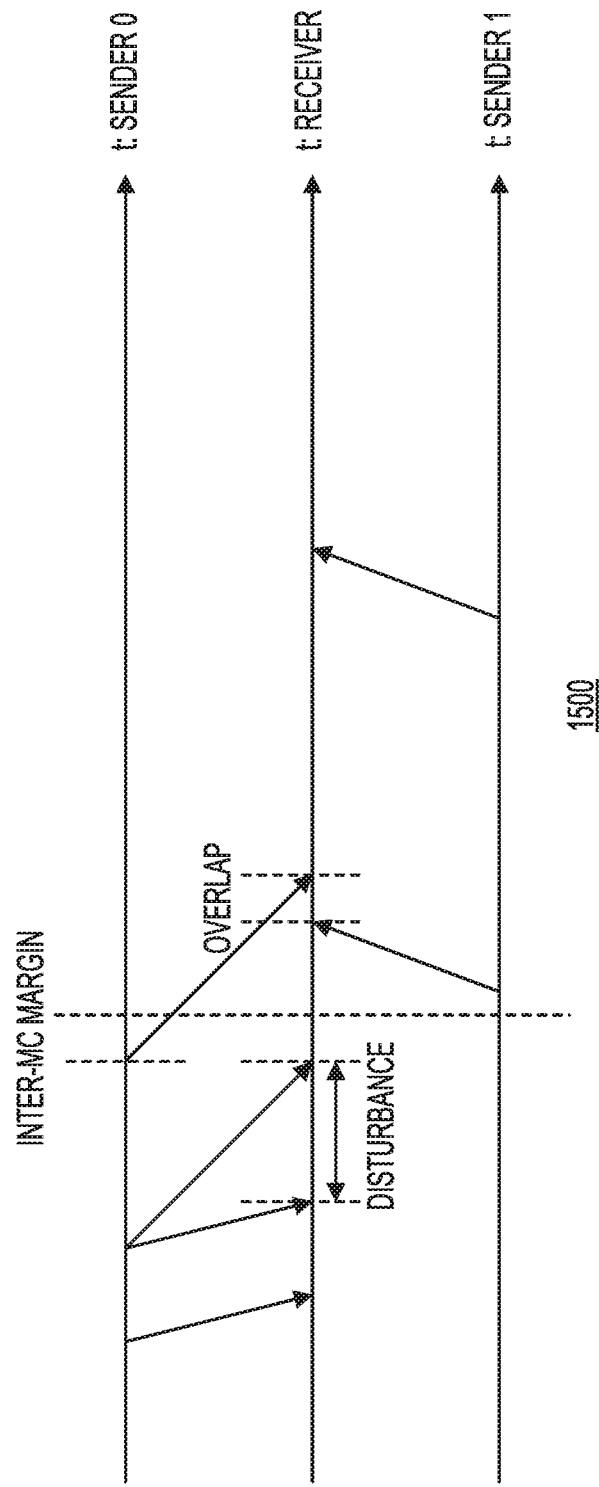
FIG. 15 shows an example exchange of messages that includes the use of an elastic buffer.

FIG. 13 shows another example of messages 1300 with the margin. This figure illustrates a different traffic pattern among the nodes. Thus, in this case, node C is transmitting messages to node B during the mega-cycle starting at time t. The node C need not wait to receive the ACK message from the node B before transmitting to the primary node A during the next mega-cycle. The node C, however, still waits to ensure the margin shown in FIG. 13. FIG. 14 shows the same example of messages 1400 with a smaller margin. In one example, the smaller margin may be accomplished using an elastic buffer (e.g., elastic buffer 230 of FIG. 2). The elastic buffer may be configured to allow a small number of DATA messages to be buffered until the current receive mega-cycle (RX-MC) ends. As an example, FIG. 15 shows an example exchange of messages 1500 that includes the use of an elastic buffer. This figure shows overlap among received messages by the receiver and yet those messages can be processed using the elastic buffer. As shown in FIG. 15, during the data transmission mega-cycle including the transmission of the messages from sender 0 to the receiver there may be disturbance in the network link. This may cause the receiver to have an overlap in terms of the receipt of the messages despite the inter-mega-cycle (inter-MC) margin. The use of the elastic buffer delays the handling of the DATA messages received, so it may lead to interleaving again in the following receive mega-cycle (RX-MC). However, given the assumption that network disturbances are rare, the impact should be gradually absorbed by the margins between data transmission mega-cycles (TX-MCs).

In one example, the elastic buffer may be implemented as elastic buffer 230 as shown in FIG. 2 earlier. In this example implementation, elastic buffer 230 may store only headers associated with the messages that need to be queued because of the overlap among the messages being received by a node. As shown in FIG. 2, the headers in header queue 240 not requiring buffering are passed via multiplexer 292 to RX metadata port 290. The buffered headers are passed via multiplexer 292 when the client (e.g., the application logic) is ready to process those headers. Elastic buffering may be implemented in other way as well. As an example, instead of storing headers, pointers to headers or other data structures may be stored in the elastic buffer.

Figure 16:
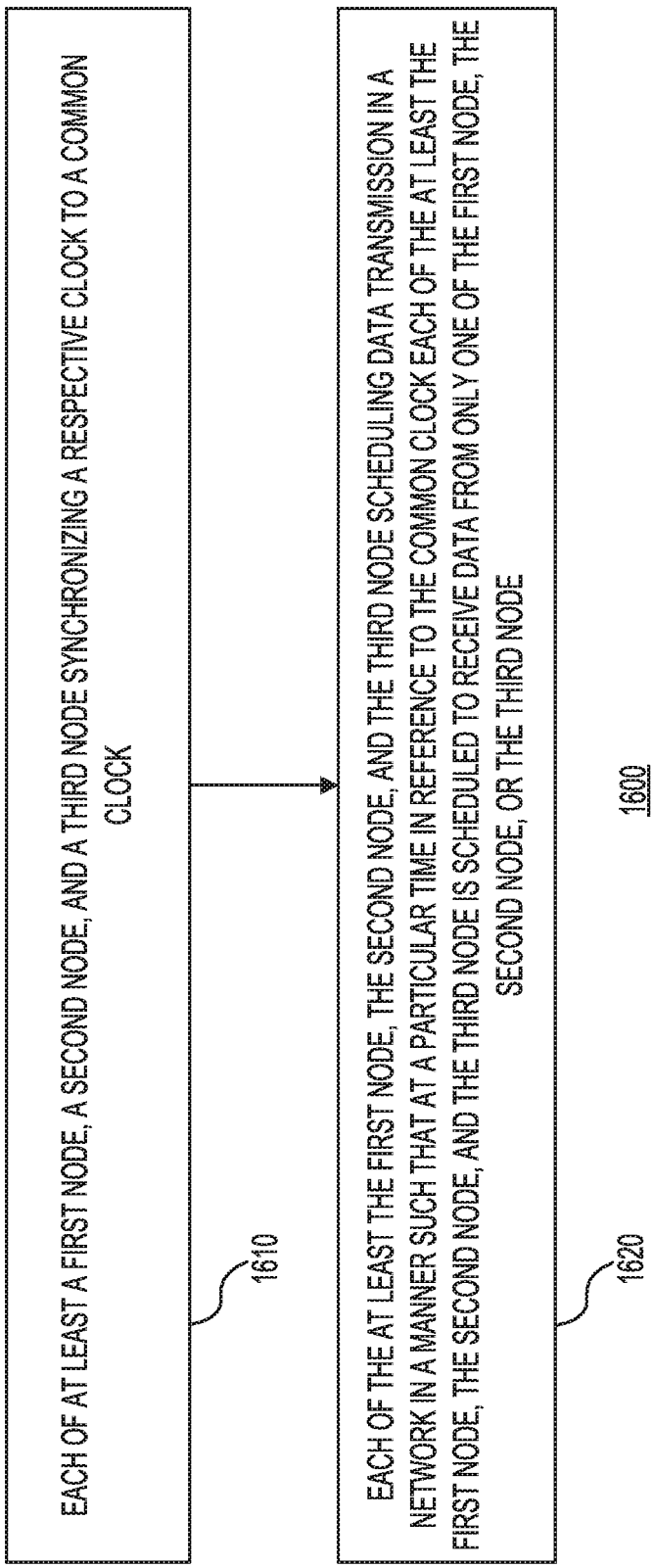
FIG. 16 shows a flow chart of a method for exchange of messages among nodes using the TSL protocol in accordance with one example.

FIG. 16 shows a flow chart 1600 of a method for exchange of messages among nodes using the TSL protocol in accordance with one example. Step 1610 may include each of the at least the first node, the second node, and the third node synchronizing a respective clock to a common clock. In this example, each of the first node, the second node, and third node may correspond to acceleration component 100 of FIG. 1. These nodes may communicate with each other using an arrangement, such as the one shown in FIG. 3. In this example, the TSL component (e.g., TSL component 200) may perform this step during the preparation phase of the TSL protocol described earlier. The common clock may correspond to a clock associated with one of the nodes, in the network, that may be selected as a primary node or a master node. The synchronization may be achieved as explained earlier by a node (e.g., node B in FIG. 7) by making attempts to synchronize its local clock with the master node (e.g., primary node A shown in FIG. 7) by sending a SYNC message to the master node. The master node may respond to the SYNC messages with the SYNC-ACK messages. Upon reception of a SYNC-ACK message, in this example, the node may calculate the delay and local time difference between itself and the master (as explained earlier). The node (e.g., node B) may then update its local clock to synchronize with the clock associated with the master node (e.g., primary node A). The synchronization among the nodes may be performed using other techniques as well. As an example, the nodes may synchronize their clock with a common clock using the Precision Time Protocol (PTP) standard.

Step 1620 may include each of the at least the first node, the second node, and the third node scheduling data transmission in the network in a manner such that at a particular time in reference to a common clock each of the at least the first node, the second node, and the third node is scheduled to receive data from only one of the first node, the second node, or the third node. In one example, this step may include performance of the data transmission phase 450. As noted earlier, the data transmission phase 450 is sliced into data transmission mega-cycles (TX-MC). In each mega-cycle, a client (e.g. the application logic) may send a metadata to its own TSL component, indicating which node it wants to send data to, and how many bytes it wants to send. In one example, each node may be provided a schedule of time slots so that each sender will only access one specific receiver during a time slot, and each receiver will receive data from a specific sender during a time slot. Thus, in this example, the sender-receiver pair cannot be changed during a slot. The sender-receiver pair can be changed between time slots. Per a given schedule, all the slots may run in lock-step, so that all of the sender-receiver pair of nodes run using the same schedule of time slots. In one example, shell 120 associated with each acceleration component may have the schedule programmed, such that at runtime, the acceleration component can transmit or receive data per the schedule. In one example, soft registers and configuration 210 associated with TSL component 200 may be used to store the schedule for a node. The schedule of time slots need not be static. As an example, changes to the schedule could be made dynamically by the nodes by coordinating a schedule among them. Although FIG. 16 shows a certain number of steps listed in a certain order, there could be fewer or more steps and such steps could be performed in a different order.

FIG. 17 shows a flow chart 1700 of a method for exchange of messages among acceleration components using the TSL protocol in accordance with one example. Step 1710 may include each of the at least the first acceleration component, the second acceleration component, and the third acceleration component synchronizing a respective clock to a common clock associated with an acceleration component selected from among the at least the first acceleration component, the second acceleration component, and the third acceleration component. In this example, each of the first acceleration component, the second acceleration component, and third acceleration component may correspond to node 100 of FIG. 1. These acceleration components may communicate with each other using an arrangement, such as the one shown in FIG. 3. In this example, the TSL component (e.g., TSL component 200) may perform this step during the preparation phase of the TSL protocol described earlier. The common clock may correspond to a clock associated with one of the acceleration components, in the network, that may be selected as a primary node or a master node. The synchronization may be achieved as explained earlier by an acceleration component (e.g., node B in FIG. 7) by making attempts to synchronize its local clock with the master node (e.g., primary node A shown in FIG. 7) by sending a SYNC message to the master node. The master node may respond to the SYNC messages with the SYNC-ACK messages. Upon reception of a SYNC-ACK message, in this example, the acceleration component may calculate the delay and local time difference between itself and the master (as explained earlier). The acceleration component (e.g., node B) may then update its local clock to synchronize with the clock associated with the master node (e.g., primary node A). The synchronization among the acceleration components may be performed using other techniques as well. As an example, the acceleration components may synchronize their clock with a common clock using the Precision Time Protocol (PTP) standard.

Step 1720 may include each of the at least the first acceleration component, the second acceleration component, and the third acceleration component scheduling data transmission in the network in a manner such that at a particular time in reference to the common clock each of the at least the first acceleration component, the second acceleration component, and the third acceleration component is scheduled to receive data from only one of the first acceleration component, the second acceleration component, or the third acceleration component. In one example, this step may include performance of the data transmission phase 450. As noted earlier, the data transmission phase 450 is sliced into data transmission mega-cycles (TX-MC). In each mega-cycle, a client (e.g. the application logic) may send a metadata to its own TSL component, indicating which acceleration component it wants to send data to, and how many bytes it wants to send. In one example, each acceleration component may be provided a schedule of e slots so that each sender will only access one specific receiver during a time slot, and each receiver will receive data from a specific sender during a time slot. Thus, in this example, the sender-receiver pair cannot be changed during a slot. The sender-receiver pair can be changed between time slots. Per a given schedule, all the slots may run in lock-step, so that all of the sender-receiver pair of acceleration components run in the same schedule of time slots. In one example, shell 120 associated with each acceleration component may have the schedule programmed, such that at runtime, the acceleration component can transmit or receive data per the schedule. In one example, soft registers and configuration 210 associated with TSL component 200 may be used to store the schedule for an acceleration component. The schedule of time slots need not be static. As an example, changes to the schedule could be made dynamically by the acceleration components by coordinating a schedule among them. Although FIG. 17 shows a certain number of steps listed in a certain order, there could be fewer or more steps and such steps could be performed in a different order.

In conclusion, the present disclosure relates to a method in a network comprising at least a first node, a second node, and a third node. The method may include each of the at least the first node, the second node, and the third node synchronizing a respective clock to a common clock. The method may further include each of the at least the first node, the second node, and the third node scheduling data transmission in the network in a manner such that at a particular time in reference to the common clock each of the at least the first node, the second node, and the third node is scheduled to receive data from only one of the first node, the second node, or the third node.

Each of the at least the first node, the second node, and the third node may be configurable to provide service acceleration for at least one service. each of the at least the first node, the second node, and the third node is configurable to communicate using a time-synchronized transport layer (TSL) protocol. The TSL protocol may comprise a plurality of phases including a characterization phase, standby phase, a preparation phase, and a data transmission phase.

The characterization phase may comprise at least one of: (1) determining a first set of latency values associated with data transmission from the first node to the second node or the third node, (2) determining a second set of latency values associated with data transmission from the second node to the first node or the third node, and (3) determining a third set of latency values associated with data transmission from the third node to the first node or the second node. A node from among the at least the first node, the second node, and the third node may be selected as a master node, where the common clock is associated with the master node, and where the master node is configured to transition from the characterization phase to the standby phase upon receiving a standby message from each of nodes other than the master node in the network.

Each node may comprise application logic configurable to provide service acceleration to at least one service, and wherein each node is configured to transition from the standby phase to the preparation phase upon receiving a request to initiate data transmission from a respective application logic. The scheduling may comprise one of dynamic scheduling or static scheduling.

In another example, the present disclosure relates to a system including a network configured to interconnect a plurality of acceleration components. The system may further include the plurality of acceleration components configurable to accelerate the at least one service, where each of the plurality of acceleration components is configured to synchronize a respective clock to a common clock associated with an acceleration component selected from among the plurality of acceleration components, and where each of the plurality of acceleration components is configured to transmit data in the network in a manner such that at a particular time in reference to the common clock each of the plurality of acceleration components is scheduled to receive data from only one of the plurality of acceleration components.

Each of the at least the first acceleration component, the second acceleration component, and the third acceleration component may be configurable to provide service acceleration for at least one service. Each of the at least the first acceleration component, the second acceleration component, and the third acceleration component may be configurable to communicate using a time-synchronized transport layer (TSL) protocol.

The TSL protocol may comprise a plurality of phases including a characterization phase, a standby phase, a preparation phase, and a data transmission phase. The characterization phase may comprise determining latency values associated with data transmission within the network. The selected acceleration component may be designated a master acceleration component, and the master acceleration component may be configured to transition from the characterization phase to the standby phase upon receiving a standby message from each of the plurality of acceleration components other than the master acceleration component in the network.

A first acceleration component may be configurable to either begin transmission of messages to a second acceleration component upon receiving an acknowledgement from the second acceleration component indicating a completion of a data transmission cycle, or begin transmission of messages to the second acceleration component before receiving an acknowledgement from the second acceleration component indicating a completion of a data transmission cycle. Each of the plurality of acceleration components may include an elastic buffer configured to allow a receipt of messages from two other acceleration components during a single data receiving cycle.

In yet another example, the present disclosure relates to a method in a network comprising at least a first acceleration component, a second acceleration component, and a third acceleration component. The method may include each of the at least the first acceleration component, the second acceleration component, and the third acceleration component synchronizing a respective clock to a common clock associated with an acceleration component selected from among the at least the first acceleration component, the second acceleration component, and the third acceleration component. The method may further include each of the at least the first acceleration component, the second acceleration component, and the third acceleration component scheduling data transmission in the network in a manner such that at a particular time in reference to the common clock each of the at least the first acceleration component, the second acceleration component, and the third acceleration component is scheduled to receive data from only one of the first acceleration component, the second acceleration component, or the third acceleration component.

Each of the at least the first acceleration component, the second acceleration component, and the third acceleration component may be configurable to provide service acceleration for at least one service. Each of the at least the first acceleration component, the second acceleration component, and the third acceleration component may be configurable to communicate using a time-synchronized transport layer (TSL) protocol. The TSL protocol may comprise a plurality of phases including a characterization phase, a standby phase, a preparation phase, and a data transmission phase It is to be understood that the systems, methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction, with transmission media. Transmission media is used for transferring data and/or instruction to or from a machine. Exemplary transmission media may include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method in a network comprising at least a first node, a second node, and a third node, the method comprising:

each of the at least the first node, the second node, and the third node synchronizing a respective clock to a common clock; and each of the at least the first node, the second node, and the third node scheduling data transmission in the network in a manner such that at a particular time in reference to the common clock each of the at least the first node, the second node, and the third node is scheduled to receive data from only one of the first node, the second node, or the third node, wherein each of the at least the first node, the second node, and the third node is configurable to communicate using a time-synchronized transport layer (TSL) protocol comprising a plurality of phases including a characterization phase, and wherein the characterization phase comprises at least one of: (1) determining a first set of latency values associated with data transmission from the first node to the second node or the third node, (2) determining a second set of latency values associated with data transmission from the second node to the first node or the third node, and (3) determining a third set of latency values associated with data transmission from the third node to the first node or the second node.

2. The method of claim 1, wherein each of the at least the first node, the second node, and the third node is configurable to provide service acceleration for at least one service.

3. The method of claim 1, wherein the TSL protocol comprises a standby phase.

4. The method of claim 3, wherein the TSL protocol further comprises a preparation phase and a data transmission phase.

5. The method of claim 1, wherein a node from among the at least the first node, the second node, and the third node is selected as a master node, wherein the common dock is associated with the master node, and wherein the master node is configured to transition from the characterization phase to the standby phase upon receiving a standby message from each of nodes other than the master node in the network.

6. The method of claim 4, wherein each node comprises application logic configurable to provide service acceleration to at least one service, and wherein each node is configured to transition from the standby phase to the preparation phase upon receiving a request to initiate data transmission from a respective application logic.

7. The method of claim 1, wherein the scheduling comprises one of dynamic scheduling or static scheduling.

8. A system comprising:
a network configured to interconnect a plurality of acceleration components; and
the plurality of acceleration components configurable to accelerate the at least one service, wherein each of the plurality of acceleration components is configured to synchronize a respective dock to a common clock associated with an acceleration component selected from among the plurality of acceleration components, and wherein each of the plurality of acceleration components is configured to transmit data in the network in a manner such that at a particular time in reference to the common clock each of the plurality of acceleration components is scheduled to receive data from only one of the plurality of acceleration components, wherein each of the plurality of acceleration components is configurable to communicate using a time-synchronized transport layer (TSL) protocol comprising a plurality of phases including a characterization phase and a standby phase, wherein the characterization phase comprises determining at least one latency value associated with data transmission within the network.

9. The system of claim 8, wherein each of the plurality of acceleration components configurable to provide service acceleration for at least one service.

10. The system of claim 8, wherein the TSL protocol further comprises a preparation phase and a data transmission phase.

11. The system of claim 10, wherein the selected acceleration component is designated a master acceleration component, wherein the preparation phase comprises the master acceleration component sending a global synchronized time to each of the plurality of acceleration components other than the master acceleration component in the network, and wherein the global synchronized time indicates a time in the future when data transmission starts.

12. The system of claim 10, wherein the selected acceleration component is designated a master acceleration component, and wherein the master acceleration component is configured to transition from the characterization phase to the standby phase upon receiving a standby message from each of the plurality of acceleration components other than the master acceleration component in the network.

13. The system of claim 8, wherein a first acceleration component is configurable to either begin transmission of messages to a second acceleration component upon receiving an acknowledgement from the second acceleration component indicating a completion of a data transmission cycle, or begin transmission of messages to the second acceleration component before receiving an acknowledgement from the second acceleration component indicating a completion of a data transmission cycle.

14. The system of claim 13, wherein each of the plurality of acceleration components includes an elastic buffer configured to allow a receipt of messages from at least two other acceleration components during a single data receiving cycle.

15. A method in a network comprising at least a first acceleration component, a second acceleration component, and a third acceleration component, the method comprising:
each of the at least the first acceleration component, the second acceleration component, and the third acceleration component synchronizing a respective clock to a common clock associated with an acceleration component selected from among the at least the first acceleration component, the second acceleration component, and the third acceleration component; and each of the at least the first acceleration component, the second acceleration component, and the third acceleration component scheduling data transmission in the network in a manner such that at a particular time in reference to the common clock each of the at least the first acceleration component, the second acceleration component, and the third acceleration component is scheduled to receive data from only one of the first acceleration component, the second acceleration component, or the third acceleration component, wherein each of the at least the first acceleration component, the second acceleration component, and the third acceleration component is configurable to communicate using a time-synchronized transport layer (TSL) protocol comprising a plurality of phases including a characterization phase comprising determining at least one latency value associated with data transmission within the network.

16. The method of claim 15, wherein each of the at least the first acceleration component, the second acceleration component, and the third acceleration component is configurable to provide service acceleration for at least one service.

17. The method of claim 15, wherein the TSL protocol comprises a standby phase.

18. The method of claim 17, wherein the TSL protocol further comprises a preparation phase and a data transmission phase.

* * * * *